(12) United States Patent
Daw et al.

(10) Patent No.: US 6,901,351 B2
(45) Date of Patent: May 31, 2005

(54) APPLICATION OF SYMBOL SEQUENCE ANALYSIS AND TEMPORAL IRREVERSIBILITY TO MONITORING AND CONTROLLING BOILER FLAMES

(75) Inventors: Charles Stuart Daw, Knoxville, TN (US); Timothy A. Fuller, North Canton, OH (US); Thomas J. Flynn, North Canton, OH (US); Charles E. A. Finney, Knoxville, TN (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 28 days.

(21) Appl. No.: 10/438,156

(22) Filed: May 13, 2003

(65) Prior Publication Data

US 2004/0039551 A1 Feb. 26, 2004

Related U.S. Application Data

(63) Continuation-in-part of application No. 10/004,000, filed on Nov. 14, 2001, now Pat. No. 6,775,645.

(51) Int. Cl.$^7$ .............................................. G06F 19/00
(52) U.S. Cl. ......................... 702/188; 700/274; 702/32
(58) Field of Search ........................... 702/188, 22, 23, 702/24, 25, 30, 32; 700/274; 431/14, 13, 76

(56) References Cited

U.S. PATENT DOCUMENTS

| | | | |
|---|---|---|---|
| 4,477,245 A | 10/1984 | Giachino et al. | |
| 5,404,298 A | 4/1995 | Wang et al. | |
| 5,465,219 A | 11/1995 | Jeffers | |
| 5,583,789 A | 12/1996 | Dahm et al. | |
| 5,798,946 A | 8/1998 | Khesin | |
| 6,071,114 A | 6/2000 | Cusack et al. | |
| 6,247,918 B1 * | 6/2001 | Forbes et al. | 431/12 |
| 6,277,268 B1 | 8/2001 | Khesin et al. | |
| 6,389,330 B1 | 5/2002 | Khesin | |
| 6,622,645 B2 * | 9/2003 | Havlena | 110/348 |
| 6,775,645 B2 * | 8/2004 | Daw et al. | 702/188 |
| 2002/0099474 A1 | 7/2002 | Khesin | |

OTHER PUBLICATIONS

Krueger et al., "Illinois Power's On–Line Operator Advisory System to Control NO$_x$ and Improve Boiler Efficiency: An Update", American Power Conference, Chicago, IL, vol. 59–1 1997.

Gleick, "Chaos: Making a New Science," Viking Press, New York, 1987.

Storgatz, "Nonlinear Dynamics and Chaos," Addison–Wesley Publishing Company, Reading, MA 1994.

Abarbanel, "Analysis of Observed Chaotic Data", Springer, New York, 1996.

Stewart, "Does God Play Dice? The Mathematics of Chaos", Basil Blackwell Inc., New York, 1989.

Ott et al., "Coping With Chaos", John Wiley & Sons, Inc., New York, 1994.

Green Jr., et al., "Time Irreversibility and Comparison of Cyclic–Variability Models", Society of Automotive Engineers Technical Paper No. 1999–01–0221 (1999).

Khesin et al., "Application of a Flame Spectra Analyzer for Burner Balancing", presented at the 6$^{th}$ International Joint ISA POWID/EPRI Controls and Instrumentation Conference, Jun. 1996, Baltimore, MD.

(Continued)

*Primary Examiner*—Patrick J. Assouad
(74) *Attorney, Agent, or Firm*—Morgan, Lewis & Bockius, LLP

(57) ABSTRACT

The current invention provides a method and apparatus, which uses symbol sequence techniques and/or temporal irreversibility derived from chaos theory to monitor the operating state of individual burner flames on a appropriate time scale. Both the method and apparatus of the present invention may be used optimize the performance of burner flames.

15 Claims, 15 Drawing Sheets

OTHER PUBLICATIONS

Fuller et al., "Enhancing Burner Diagnostics and Control with Chaos–Based Signal analysis Techniques", 1996 International Mechanical Engineering Congress and Exposition, Atlanta, GA, vol. 4, pp. 281–291, Nov. 17–22, 1996.

Adamson et al., "Boiler Flame Monitoring Systems for Low NOx Applications—An Update", American Power Conference, Chicago, IL, vol. 59–1, 1997.

Khesin et al., "Demonstration Tests of New Burner Diagnostic System On A 650 MW Coal–Fired Utility Boiler", American Power Conference, Chicago, IL, vol. 59–1 1997.

J. Timmer et al., "Linear and Nonlinear Time Series Analysis of the Black Hose Candidate Cygnus X–1", Phys. Rev. E 61, 1342, (2000).

J.P. Crutchfield et al., "Symbolic Dynamics of Noisy Chaos", Physica 7 D, 201 (1983).

J.P. Crutchfield et al., "Inferring Statistical Complexity", Physical Rev. Lett. 63, 105 (1989).

A.B. Rechester et al., "Symbolic Kinetic Equation for a Chaotic Attractor", Phys. Lett. A 156, 419 (1991).

A.B. Rechester et al., "Symbolic Kinetic Analysis of Two–Dimensional Maps", Phys. Lett. A 158, 51 (1991).

X.Z. Tang et al., " Symbol Sequence Statistics in Noisy Chaotic Signal Reconstruction", Phys. Rev. E51, 3871 (1995).

U. Schwarz et al., "Analysis of Solar Spike Events by Means of Symbolic Dynamics Methods", Astron. Astrophys. 277, 215 (1995).

J. Kurths et al., "Quantative Analysis of Heart Rate Variability", Chaos 5, 88 (1995).

M. Lehrman et al.., "Symbolic Analysis of Chaotic Signals and Turbulent Fluctuations", Phys. Rev. Lett 78, 54 (1997).

X.Z. Tang et al., "Data compressions and Information Retrieval via Symbolization", Chaos 8, 688 (1998).

C.E.A. Finney et al., "Symbolic Time–Series Analysis of Engine Combustion Measurements", Society of Automotive Engineers Technical Paper No. 980624 (1998).

C.S. Daw et al., "Statistical Physics, Plasmas, Fluids, and Related Interdisciplinary Topics", Phys. Rev. E 57, 2811 (1998).

H. Voss et al., "Test for Nonlinear Dynamical Behavior in Symbol Sequences", Phys. Rev. E 58, 1155 (1998).

C.J. Starn et al., "Reliable Detection of Nonlinearity in Experimental Time Series with Strong Periodic Components", Physical D 112, 361 (1998).

B.P.T. Hoekstra et al., "Nonlinear Analysis of the Pharmacological Conversion of Sustained Atrial Fibrillation I Conscious Goats by the Class Ic Drug Cibenzoline", Chaos 7, 430, (1997).

L. Stone et al., "Detecting Time's Arrow: A Method for Identifying Nonlinearity and Deterministic Chaos in Time–Series Data.", Proc. Roy. Soc. London, Ser. B 263, 1509 (1996).

M.J. van der Heyden et al., "Testing the Order of Discrete Markov Chains Using Surrogate Data", Physica D 117, 299 (1998).

C.Diks et al., Reversibility as a Criterion for Discriminating Time Series, Phys. Lett. A 201, 221 (1995).

A.J. Lawrance, "Directionality and Reversibility in Time Series", Int. Stat. Rev. 59, 67 (1991).

G. Weiss, "Time Reversibility, of Linear Stochastic Processes", J. Appl. Prob. 12, 831 (1975).

C.S. Daw et al., "Symbolic Approach for Measuring Temporal 'Irreversibility'", Phys. Rev. E 62, 1912 (2000).

* cited by examiner

* Used in conjunction with symbol histograms to improve discrimination
* Targets instability at multiple time scales

APPLICATION OF SYMBOL SEQUENCE ANALYSIS AND TEMPORAL IRREVERSIBILITY TO MONITORING AND CONTROLLING BOILER FLAMES

This application is a continuation-in-part of U.S. patent application Ser. No. 10/004,000, filed Nov. 14, 2001 now U.S. Pat. No. 6,775,645. U.S. patent application Ser. No. 10/004,000 is incorporated herein by reference in its entirety.

FIELD OF THE INVENTION

The present invention relates, in general, to methods and apparatus for boiler flame diagnostics and control. More particularly, the present invention provides methods and apparatus for monitoring the operating state of burner flames using temporal irreversibility and symbol sequence techniques.

DESCRIPTION OF THE RELATED ART

Economic pressures and increasingly restrictive environmental regulations have contributed to an increasing need for advanced management systems that efficiently regulate utility boilers. Inefficient boiler control is responsible for wasting large amounts of fuel heating value and releasing nitrogen oxide pollutants into the atmosphere.

Monitoring systems that accurately reflect burner-operating states are essential to advanced boiler management. Accurate monitoring of burner-operating states is more important for advanced low-$NO_x$ burners than conventional burners because low-$NO_x$ burners are more sensitive to changes in operating parameters and feed system variations. Conventional combustion monitoring systems provide information that has been averaged over many burners and long time scales (e.g., measurements of excess air, coal feed, or $NO_x$ emissions at time scales of several minutes or hours). However, large $NO_x$ and carbon burnout fluctuations can occur in individual burners over short time scales (i.e., between about 10 seconds to fractions of a second). These fluctuations produce widely different boiler performance for operating conditions that otherwise are indistinguishable. Accordingly, combustion diagnostics should reflect both long and short time-scale transients for more reliable boiler optimization.

A key variable in the combustion of fossil fuels, such as oil, gas and pulverized coal, is the air/fuel ("A/F") ratio. The A/F ratio strongly influences the efficiency of fuel usage and the emissions produced during the combustion process (especially, for low-$NO_x$ burners). The A/F ratio also affects slagging, fouling and corrosion phenomena that typically occur in the combustion zone. In current steam generators fired with fossil fuel, the A/F ratio is controlled by measurement of oxygen and/or carbon monoxide ("CO") concentration in the stack gases or at the economizer outlet. In either case, the gas measurement is taken at a location removed from the actual location of the combustion process. Unfortunately, in multiburner, steam generator furnaces the A/F ratio differs from burner to burner and accordingly may vary significantly with burner location. Since both combustion efficiency and $NO_x$ generation levels depend on the localized values of the A/F ratio (i.e., the distribution and mixing within each flame), measurement and control of the global A/F ratio produced by the entire furnace of the steam generator does not necessarily optimize performance.

A number of factors can change the A/F ratio during normal boiler operation. These variables include coal pulverizer wear, which may lead to a change in the size distribution of the coal particles, change in the overall fuel flow rate from the pulverizer, change in the distribution among burners of the fuel flow, change in the distribution of fuel within the flame due to erosion/corrosion of the impeller or conical diffuser, change in the overall air flow rate change in the distribution of air among individual burners and change in the distribution of air among individual burners due to change in the position of air registers.

All burners (especially, burners with staged air and/or fuel injection) undergo characteristic transitions in dynamic stability (i.e., bifurcations) as the above parameters are varied. The most important burner bifurcations are caused by the nonlinear dependence of flame speed on the relative amounts of fuel and air present. In particular, flame speed (i.e., combustion rate) drops exponentially to zero when the A/F ratio approaches either fuel-lean or fuel-rich flammability limits. Fuel-lean refers to conditions where excess air (i.e., oxygen) is present and fuel-rich refers to conditions where excess fuel is present. Local variation in the A/F ratio creates some zones adjacent to the burner that sustain combustion and other zones that do not sustain combustion. These zones may interact through complex mechanisms that depend on the details of turbulent mixing imposed by burner design, specific operating settings and the relative amounts and spatial distribution of incoming fuel and air. In coal-fired burners, the complexity of the process is further increased by the presence of both solids and volatile components in the fuel, which mix and burn at characteristically different rates. The details of the distribution and interaction of combusting and non-combusting zones is critical in determining the efficiency of fuel conversion and the levels of pollutants emitted (such as oxides of nitrogen and carbon monoxide).

Although the dynamics of coal-fired burners are complex, certain global bifurcations in flame structure typically occur. These global bifurcations represent conditions under which the dominant structure of the flame (e.g., the global flame shape, size, or location) suddenly changes from stable to unstable or vice-versa. These stability shifts are driven by changes in the relative A/F ratios in the primary and secondary combustion zones, changes in the gas velocity profile, and/or the rate of mixing between these zones. A typical operating condition for low $NO_x$ coal-fired burners involves fuel-rich combustion in the primary zone and fuel-lean combustion in the secondary zone. Primary zone combustion becomes unstable and flickers on and off in repeated ignition and extinction events, when conditions in the primary zone are too rich or the flow velocity is too high. Under extreme conditions, primary zone combustion may be completely extinguished.

Extinction of combustion at the base of the primary zone represents a bifurcation in which the "attached" flame state is no longer stable (i.e., the initial flame front is no longer supported in the vicinity of primary air and fuel exit pipes). When the initial flame front is no longer supported in the vicinity of the fuel exit pipes, the flame front may shift axially downstream from the face of the burner and can assume a detached "lifted" condition. A lifted flame represents an alternate stable flame state that can persist even though the attached flame is unstable. In a lifted flame, the distance from the burner face to the flame boundary and the stability of that boundary depends on many factors such as the primary air exit velocity, the A/F ratio in the secondary zone and the detailed air flow velocity profile. Under some conditions, stable lifted and attached flame states may co-exist, so that the burner can assume either condition depending on the initial burner state. External perturbations to the burner (e.g., air or fuel flow disturbances) may cause transitions between these two states.

Extinction of combustion in the primary zone can also occur if there is an excessive amount of oxygen present. This can happen in coal-fired burners when the release of volatile matter from the fuel is too slow to keep the gas mixture above the lean flammability limit. Whether caused by high air velocity or excessively rich or lean primary zone conditions, lifted flames are an undesirable operating condition typically associated with excessive emissions of pollutants.

Bifurcations and associated flame front shifting can also occur in the radial direction due to excessively high or low rates of mixing between primary and secondary zones. These types of bifurcations can produce axial shifts in flame shape and symmetry that result in helical and/or side-to-side motions. In some cases, flame size may also undergo large expansion and contraction. Large variations in the amount of visible and infrared light emissions from the flame are observed during such events. Like axial flame shifting, radial flame shifts are associated with excessive emissions of pollutants and reduced fuel utilization. As is well known to those of skill in the art, an optimal flame diameter exists. Larger or smaller flame diameters are usually detrimental to performance.

Conventional analysis methods such as Fourier analysis and univariate statistics are based on assumptions that are not entirely valid for burners. Specifically, Fourier analysis assumes that the described processes are linear (i.e., processes in which the observed behavior is produced by superposition of simple modes), while univariate statistics assumes that each event is random and independent from events at other times (i.e., there is no time correlation). When these assumptions are incorrect the results from Fourier analysis and univariate statistics can provide either misleading results or results that are insensitive to real differences (M. J. Khesin et al., "Demonstration Tests of New Burner Diagnostic System on a 650 MW Coal-Fired Utility Boiler," American Power Conference, Chicago, Ill., Volume 59-1, 1997; Krueger et al., "Illinois Power's On-Line Operator Advisory System to Control $NO_x$ and Improve Boiler Efficiency: An Update," American Power Conference, Chicago, Ill., Volume 59-1, 1997; Adamson, et. al., "Boiler Flame Monitoring Systems for Low $NO_x$ Applications—An Update," American Power Conference, Chicago, Ill., Volume 59-1, 1997; Khesin, M., et. al., "Application of a Flame Spectra Analyzer for Burner Balancing," presented at the 6th International ISA POWID/EPRI Controls and Instrumentation Conference, June 1996, Baltimore, Md.)

Chaos theory (especially, symbol sequence techniques and temporal irreversibility) avoids the assumptions of conventional analytical methods and thus may provide information unavailable from these well-known techniques. Chaos theory is a prominent new approach for understanding and analyzing deterministic nonlinear processes, which provides specific tools for detecting and characterizing fluctuating unstable patterns of these processes (Gleick, "Chaos: Making a New Science," Viking Press, New York, 1987; Stewart, "Does God Play Dice? The Mathematics of Chaos," Basil Blackwell Inc., New York, 1989; Strogatz, "Nonlinear Dynamics and Chaos," Addison-Wesley Publishing Company, Reading, Mass., 1994; Ott et al., "Coping with Chaos," John Wiley & Sons, Inc., New York, 1994; Abarbanel, "Analysis of Observed Chaotic Data," Springer, New York, 1996). Chaos theory has been applied to feedback systems and burner flame analysis (Wang et al. U.S. Pat. No. 5,404,298; Jeffers, U.S. Pat. No. 5,465,219; Fuller et al., "Enhancing Burner Diagnostics and Control with Chaos-Based Signal Analysis Techniques," 1996 International Mechanical Engineering Congress and Exposition, Atlanta, Ga., vol. 4, pp 281–291, Nov. 17–22, 1996; J. B. Green, Jr. et al., "Time Irreversibility and Comparison of Cyclic-Variability Models," Society of Automotive Engineers Technical Paper No. 1999-01-0221 (1999). Because combustion is highly nonlinear, analytical techniques derived from chaos theory (especially, symbol sequence techniques and temporal irreversibility) may be particularly useful for burner flame analysis.

Thus, it has become apparent that new apparatus and methods for monitoring the operating states of burner flames are needed. In particular, what is needed is a method and apparatus that can monitor the operating states of individual burners using nonlinear analytical methods such as symbol sequence analysis and temporal irreversibility on a diagnostically meaningful time scale.

SUMMARY OF THE INVENTION

The current invention satisfies this and other needs by providing a method and apparatus, which uses symbol sequence techniques and/or temporal irreversibility methods to monitor the operating state of individual burner flames on an appropriate time scale. Both the method and apparatus of the present invention may be used to optimize the performance of burner flames.

In one aspect, the invention provides a method of monitoring the operating state of a burner flame. First, sensor data representing the operating state of a burner flame is obtained. Second, the data is analyzed with symbol sequence techniques and/or temporal irreversibility methods in combination with conventional statistics and Fourier transforms to determine the operating state of the burner flame. In a more specific embodiment, the operating state of the burner flame is changed on the basis of the first two steps above. Preferably, in this embodiment, the operating state of the burner flame is changed to an optimal flame.

In one embodiment, the burner flame is a low-$NO_x$ coal flame. In another embodiment, the burner flame is an oil flame.

In one embodiment, the data on the burner flame operating state is further processed. In another embodiment the data is stored. In yet another embodiment, the operating state of the burner flame is communicated to a display.

Preferably, a sensor is used to obtain a data on the operating state of the burner. More preferably, the sensor is an optical scanner. In one embodiment, the scanner is an infrared scanner. In another embodiment, the sensor is a pressure transducer or an acoustical scanner.

Preferably, the operating state of the burner flame is converted to a sequence symbol histogram. In one embodiment, the symbol sequence histogram is further stored. In another embodiment, the symbol sequence histogram is compared with a library of symbol sequence histograms to determine the operating state of the burner flame. In one embodiment, the temporal irreversibility function is a time delay function, a time delay and symbolic function or a symbolic function.

In one embodiment, the operating state of the burner flame is an edge lifting flame. In another embodiment, the operating state of the burner flame is a sporadic lifting flame. In still another embodiment, the operating state of the burner flame is an unsteady fuel feed flame. In still another embodiment, the operating state of the burner flame is a flaring flame. In still another embodiment, the operating state of the burner flame is a pancaked flame. In still another embodiment, the operating state of the burner flame is a flapping flame. In still another embodiment, the operating state of the burner flame is an optimal flame.

In one embodiment, the operating state of the burner flame is correlated to the total A/F ratio of the burner flame. In another embodiment, the operating state of the burner flame is correlated to the primary air/coal ratio of the burner flame.

In one embodiment, the potential root causes of non-optimal flames are identified based upon a library of root causes for certain flame states.

In a second aspect, the present invention provides an apparatus for monitoring the operating state of the burner flame. The apparatus has a sensor that provides data on the operating state of the burner flame, which is coupled to a computer that performs symbol sequence analysis on the data to determine the operating state of the burner flame. The computer may also calculate a temporal irreversibility function from the data. Preferably, the temporal irreversibility function is a time delay function, a time delay and symbolic function or a symbolic function. In a preferred embodiment, the apparatus is coupled to an existing control unit (traditional distributed control system (DCS) or neural-network-based control system or a combination of both) that can change the operating state of the burner flame.

In one embodiment, the apparatus has a display coupled to the computer that exhibits the operating state of the burner flame. In another embodiment, the apparatus has a data processor coupled to the computer. In yet another preferred embodiment, the apparatus has a data storage unit coupled to a computer.

In one embodiment, the burner flame is a low-$NO_x$ coal flame. In another embodiment, the burner flame is an oil flame.

Preferably, the sensor is an optical scanner. In one embodiment, the scanner is an infrared scanner. In another embodiment, the sensor is a pressure transducer or an acoustical sensor.

Preferably, the apparatus of the invention converts the operating state of the burner flame to a sequence symbol histogram. In one embodiment, the symbol sequence histogram is stored. In another embodiment, the symbol sequence histogram is compared with a library of symbol sequence histograms to determine the operating state of the burner flame.

In one embodiment, the operating state of the burner flame is an edge lifting flame. In another embodiment, the operating state of the burner flame is a sporadic lifting flame. In still another embodiment, the operating state of the burner flame is an unsteady fuel feed flame. In still another embodiment, the operating state of the burner flame is an unsteady fuel feed flame. In still another embodiment, the operating state of the burner flame is a flaring flame. In still another embodiment, the operating state of the burner flame is a pancaked flame. In still another embodiment, the operating state of the burner flame is a flapping flame. In still another embodiment, the operating state of the burner flame is an optimal flame.

In one embodiment, the operating state of the burner flame is correlated to the total A/F ratio of the burner flame. In another embodiment, the operating state of the burner flame is correlated to the primary air/coal ratio of the burner flame.

In one embodiment, weighting factors are applied to some or all of the analyses including conventional statistics, temporal irreversibility and symbol sequence to produce an overall assessment of the operating state of the burner. This overall assessment is stored as a library function to which future assessments can be compared to both qualitatively and quantitatively describe the operating state of the burner.

In one embodiment, the potential root causes of non-optimal flames are identified based upon a library of root causes for certain flame states.

BRIEF DESCRIPTION OF THE DRAWINGS

FIG. 8($b$) illustrates Fourier power spectra for different burner conditions on a logarithmic scale;

FIG. 9($b$) illustrates a histogram for a burner with a PA/C ratio of 3.32;

DETAILED DESCRIPTION OF THE INVENTION

Reference will now be made in detail to preferred embodiments of the invention. While the invention will be described in conjunction with the preferred embodiments, it will be understood that it is not intended to limit the invention to those preferred embodiments. To the contrary, it is intended to cover alternatives, modifications, and equivalents as may be included within the spirit and scope of the invention as defined by the appended claims.

The apparatus and method of the present invention are based on association of detrimental operating states of burner flames (i.e., bifurcations) with characteristic flicker patterns in measurements of burner flames (preferably, optical measurements). The intensity of flicker patterns increases as the bifurcation point is approached (i.e., the existing flame state approaches the point of becoming completely unstable or non-existent). Each type of bifurcation is characterized by a unique flicker pattern. Thus, assessment of the degree of closeness to the bifurcation moment and identification of the particular bifurcation is possible by making suitable physical measurements of the burner flame.

The flicker patterns can define a stability map for a particular burner design, which can then be used to determine the operating state of that burner. Further, measurements of detrimental operating states of burner flames may be compared to measurements of optimal operating states of burner flames. Also, because most bifurcations are generic to burners of the same class (e.g., staged, low-emissions burners with swirl), the method and apparatus of the current invention may be used to determine operating states of untested burners of the same basic class.

Figure 1:
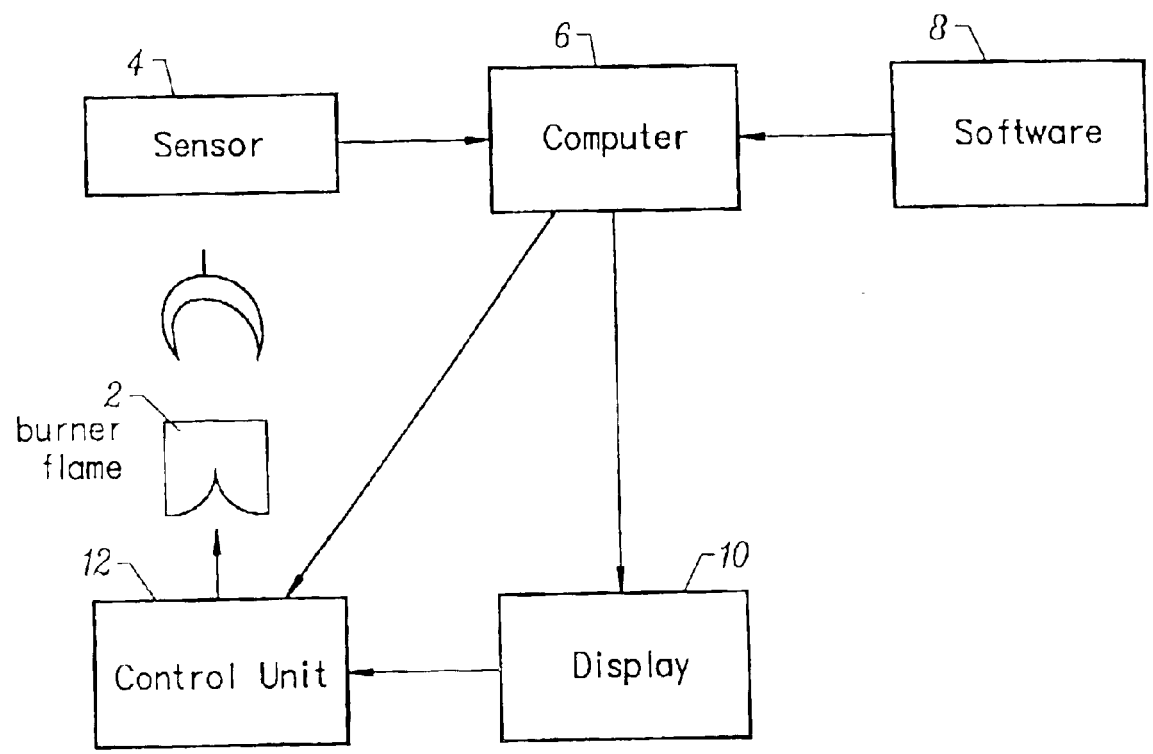
FIG. 1 illustrates a block diagram of the apparatus of the invention.

FIG. 1 illustrates a block diagram of an apparatus of the present invention. Briefly, sensor 4, situated adjacent to burner flame 2, provides a signal that contains information about the operating state of the burner flame. The signal may be transferred to a computer 6, which has access to symbol sequence analysis and/or temporal irreversibility programs 8. Those of skill in the art will appreciate that computer 6 may also access conventional analysis programs 8 such as Fourier analysis, univariate statistics and/or cluster analysis programs. Computer 6 may analyze the signal using symbol sequence and/or temporal irreversibility and/or Fourier analysis and/or univariate statistics and/or cluster analysis programs 8 to detect and identify burner flame bifurcations and root causes of such bifurcations, which are the physical causes of, or reasons for, the bifurcations, such as operating conditions or settings or equipment deterioration, degradation or malfunctions. The result of data analysis by computer 6 may be sent to display 10, which may graphically exhibit a representation of the operating state of the burner flame for viewing by an operator. The root cause of non-optimal flame conditions may also be sent to display 10. The operator may, after viewing the results at display 10, use control unit 12 to modulate the burner flame 2. Alternatively, computer 6 may compare the current operating state of burner flame 2 with a library of stored burner operating states and root causes associated with non-optimal burner states or bifurcations to determine the operating state of burner flame 2 and the root cause of such non-optimal flame condition. If the burner flame operating state is non-optimal, computer 6 may direct existing control unit 12 to adjust the operating state of burner flame 2.

Although, the block diagram (FIG. 1) of the apparatus of the current invention shows only one sensor and one burner flame, it should understood that extension to multiple burner flames is possible by locating at least one sensor adjacent to every burner flame. Further, more than one sensor can be used to monitor a single burner flame.

Figure 7:
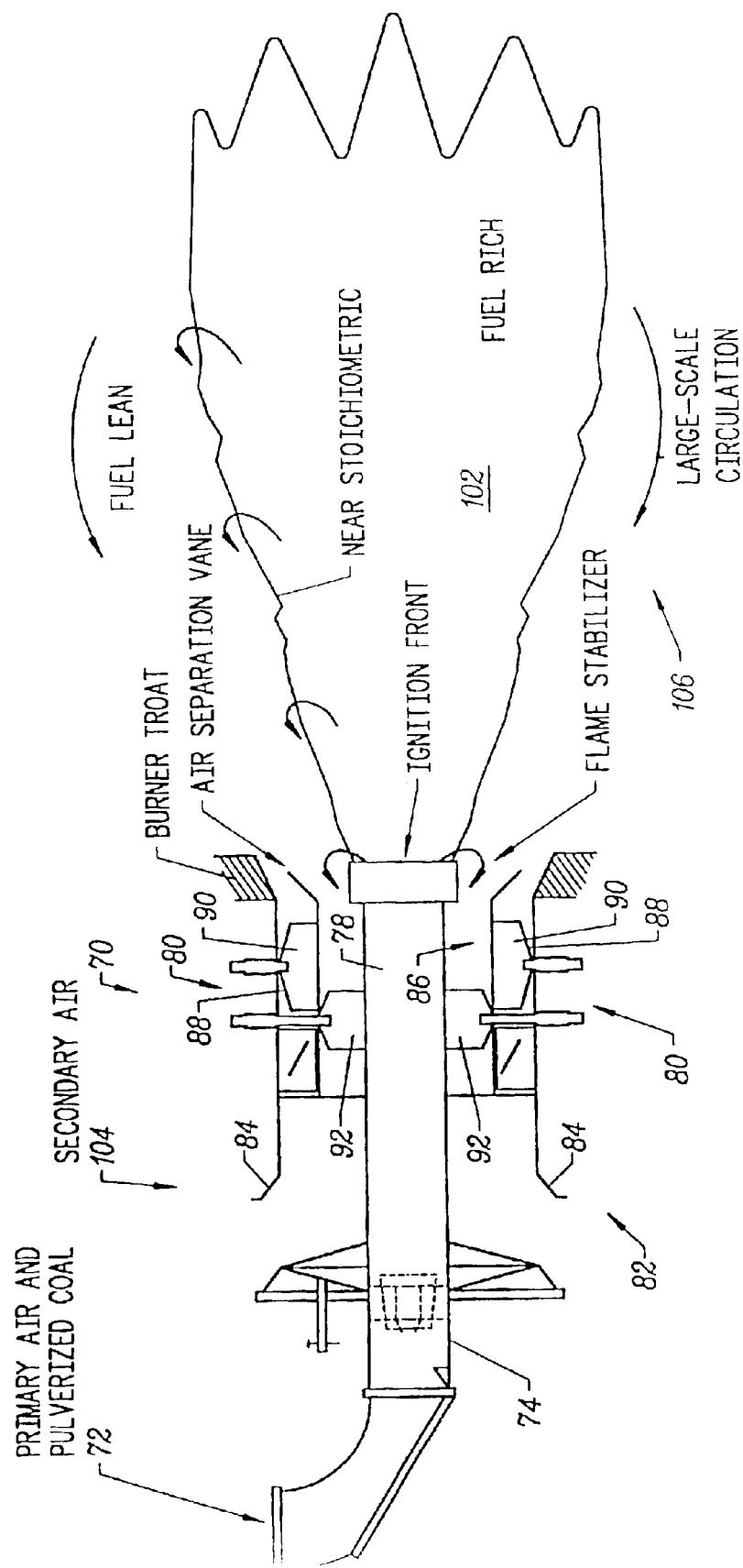
FIG. 7 illustrates a conventional low-$NO_x$ burner (specifically, of the XCL type)

Referring now in more detail to FIG. 1, burner flame 2 may be any pulverized-coal-fired or oil-fired burner, including but not limited to wall-fired, tangentially fired, low-$NO_x$ or traditional burners. Preferably, burner flame 2 is an oil flame or a low-$NO_x$ coal flame. In a preferred embodiment, burner flame 2 is a low-$NO_x$ coal flame. Preferably, in this embodiment, the burner flame is provided by a wall-fired low-$NO_x$ burner typified, but not limited to the XCL design (see FIG. 7). In one embodiment, burner flame 2 is part of a commercial utility boiler. In another embodiment, burner flame 2 is part of an industrial boiler.

A sensor 4 that provides a signal about the operating state of the burner flame is located adjacent to the burner flame 2 in the apparatus of the current invention. Preferably, the sensor is an optical scanner (more preferably, an infrared scanner). Conventional optical flame scanners such as those supplied by the Forney Corporation (Dallas, Tex.), DR-6.1 dual-range scanners, Fossil Power System Inc.'s (Dartmouth, Nova Scotia) Spectrum VIR VI scanners and Coen Company Inc.'s (Burlingame, Calif.) Series 7000 scanners are preferred. Other preferred optical scanners include Detector Electronics Corporation (Minneapolis, Minn.) C9500 series scanners and Fireye (Derry, N.H.) 45RM4 series scanners. Frequently, commercial optical scanners such as the Forney and the Fossil Power scanners filter the signal to remove low frequency data. Signal filtering in the scanner unit is not essential to the practice of the current invention.

The sensor may also be a pressure transducer (e.g., a MKS Baratron Model 223B, (MKS Instruments, Andover, Mass.)) or an acoustical transducer (e.g., a PCB Piezotronics Model 106B50, (PCB Piezotronics, Depew, N.Y.)). The optimum position of sensor 4 relative to burner flame 2 must be empirically determined and is well within the ambit of those of skill in the utility boiler arts.

Sensor 4 provides a signal containing data about the operating state of burner flame 2. The signal is preferably collected prior to signal processing by signal processors typically included in many commercially available sensors. This arrangement provides a signal with maximum dynamic content that is unaffected by signal processing, which may remove relevant data.

Preferably, the signal is sampled directly by computer 6 or some other digitized data storage buffer, such as the hard drive of computer 6. Conventional methods for transferring signal from the sensor 4 to computer 6 are well known to those of ordinary skill in the art. The identity of computer 6 is not critical to the success of the current invention. Preferably, computer 6 is a personal computer.

Preferably, sensor 4 provides a signal, which is continuous rather than a pulse train. The sampling rate of the signal should be at least about 1000 Hz, which is sufficient to capture at least two significant flame events (i.e., flame flicker at about one second duration and rmicrobursts at about a 0.1 second duration). If the signal is sampled at greater than 1,000 Hz the data is preferably resampled to yield a 1,000 Hz data stream. Resampling must occur at a rate sufficiently slower than the parent signal sample rate to avoid aliasing (i.e., one must satisfy the Nyquist criteria) as is well known to the skilled artisan. Another important issue is making certain that the total contiguous sampling period for a single flame condition is sufficiently long to capture a statistically representative sample of the flame dynamics. Typically, a representative sample for low-NOx burners is collected in between about thirty seconds and about two minutes. In addition, the recorded signal should be digitized with sufficient precision (i.e., at least 12-bit resolution) to ensure accurate reproduction of the dynamic quality of the flame.

Alternatively, the signal from sensor 4 may be recorded on a suitable media (e.g., tape, disk, etc.) or stored in a data storage unit and then resampled and transferred to computer 6 at a later time. Recording allows for the preservation of the original signal and may be convenient in handling large data sets. Recorded signal may be transferred to computer 6 by conventional methods.

The signal from sensor 4 may be examined for obvious forms of distortion, such as 60-Hz noise or harmonics of 60-Hz, during sampling by computer 6. The signal may also be inspected for contamination caused by sensor artifacts, which include, but are not limited to, high-pass filtering or noise from dedicated power supplies. Frequently, commercial sensors (especially, optical scanners) are equipped with a high-pass filter, which is usually set to between about 10 and about 300 Hz. Such high-pass filtering minimizes the number of false positive indications when the scanner is used to detect whether the flame is on.

The signal may also be analyzed for sensor saturation, as indicated by flat peaks in a time series representation of the signal. If the sensor is saturated, the sensitivity should be reduced to prevent signal cut-off, which adversely affects subsequent data analysis.

The sensor signal (preferably, from an optical scanner) may also be examined for low-NOx burners to determine if sensor electronics are stationary relative to the burner flame conditions by computer 6. Burner flame drift is inevitable as the flame changes and hardware performance degrades. Since detecting change in burner flame operating states is the focus of the current invention, the drift in sensor electronics should be slow relative to burner flame drift or else changes in burner flame operating states will not be discriminated. Drift in sensor electronics should be checked from time to time (e.g., over five minute periods) by sampling in the "blinded" condition (that is, a condition where the optical input to the scanner is blocked) and statistically evaluating the baseline signal. If the frequency distribution of the baseline signal remains unchanged (within a 95% confidence interval) then the drift in sensor electronics is slow relative to burner flame drift. Finally, the signal may also be normalized by computer 6 to remove biases caused by experimental error (e.g., dirty lenses on an optical scanner or differences in optical scanner gain settings).

The signal may be stored in a buffer, which is continuously refreshed in a first-in/first-out (FIFO) manner. This type of storage provides a "moving window" of data that reflects the current state of the burner at a point in time and provides a sufficient number of points to perform the subsequent analysis.

After signal conditioning, as described above, computer 6 may then be used to analyze the collected data. Although signal conditioning is preferred, it should be understood that it is not strictly necessary to practice the current invention. In certain circumstances, it may desirable to analyze raw data collected by sensor 4, for example, when conditioning has been incorporated into the symbolization process. In the subsequent analysis of data collected by sensor 4, the nature of the fluctuations (the alternating current or AC component of the signal) is usually more important than the mean flame intensity (the direct current or DC component of the signal).

The data contained in the signal may be initially characterized by standard statistics and Fourier transform methods by computer 6. Preferably, statistics such as overall range, variance, standard deviation, skewness, rms, and kurtosis are calculated using conventional programs. Kurtosis is especially useful in detecting non-Gaussian distributions, which are characteristic of important transitions in operating states of burner flames. These standard statistics are useful for characterizing data distribution but, however, provide no information about temporal patterns for the data.

Fourier transforms are methods well known to the skilled artisan for characterizing temporal patterns and are particularly useful in identifying time scales in the signals. Software packages that implement Fourier analysis are well known to the skilled artisan. Standard power spectral density functions are typically used to depict the results of Fourier transformation of the data collected from burner flames. A power spectral density function represents the variance (i.e., power) in each signal as a linear superposition of the sinusoidal variance at all possible frequencies. Although Fourier transform is based on a linear model for the underlying dynamics, this analytical method can provide useful information about nonlinear data by identifying important characteristic time scales in the signal.

Fourier analysis is typically characterized by significant error when it is used to describe nonlinear processes. Thus, Fourier transforms are often not able to effectively discriminate between significantly different dynamic states (see, FIGS. 8a and 8b). Accordingly, the ability of Fourier transform methods to provide meaningful information about burner flame operating states is limited.

The standard statistics and Fourier transform information obtained from the data may be compared with libraries of standard statistics and Fourier transforms previously measured for different burner operating states. Further, the standard statistics and Fourier transform information obtained from the data for a particular burner operating state may be added to existing libraries of standard statistics and Fourier transforms or may be used to construct new libraries of standard statistics and Fourier transforms.

Cluster analysis may also be applied to results of the individual flame analyses to identify similar and different flame conditions. Cluster analysis divides data into groups or clusters for the purpose of summarizing relationships between data. The goal of clustering is that the objects in a group or cluster should be similar or related to one another and different or unrelated to the objects in other groups. Steinbach (Steinbach, M., Ertoz, L. and Kumar, V. "*The Challenges of Clustering High Dimensional Data*") describes the general approach for cluster analysis and the difficulties of clustering high dimensional data such as burner flame flicker data. An important application of clustering in this case is to group burners according to similar problems or burner states.

The cluster analysis may employ the following techniques, but is not limited to the described techniques. The analysis results are represented as points (vectors) in a multi-dimensional space, where each dimension represents a distinct attribute, such as standard deviation, kurtosis, skewness, rms, etc. The set of results is represented by an m by n matrix, where the rows of the matrix are the burners and the columns are specific analysis results such as kurtosis, skewness, rms, etc. In general, the numerical attributes important for flame diagnostics are quantitative and characterized by continuous data scales, i.e, an infinite number of real values. Qualitative attribute types are also possible such as the description of flame state (e.g., edge lifting, sporadic lifting, or unsteady fuel feed). The attributes can be standardized so that all the attributes are on the same scale. This facilitates making comparisons and separating data into clusters. The matrix of results is known as the pattern matrix or data matrix.

Next, a proximity matrix is generated. Generally, a proximity matrix consists of an m by m matrix containing all the pairwise dissimilarities or similarities between the objects being considered. For example, if $x_i$ and $x_j$ are the $i^{th}$ and $j^{th}$ objectives, respectively, then the entry at the $i^{th}$ row and $j^{th}$ column of the proximity matrix is the similarity or dissimilarity between $x_i$ and $x_j$. The specific objects being compared can be a scalar or vector value. For example, two time asymmetry frequency distributions can be tested for similarity by using a statistic test for similarity of distributions assuming an appropriate confidence interval. Criteria or thresholds are established to determine the placement of a data point with adjoining cluster groups. A variety of definitions of clusters are described by Steinbach including well-separated, center-based, contiguous (nearest neighbor or transitive clustering), and density based clusters. A variety of criteria can be used to define similarity or dissimilarity between data points. The quality of separation of data into clusters depends on the quantitative measure used. Many different measures have been defined. One of the most common proximity measures is the Euclidean distance between points known as the Minkowski measure:

$$p_{ij} = \left\{ \sum_{k=1}^{d} |x_{ik} - x_{jk}|^r \right\}^{1/r}$$

where, r=2 is a parameter yielding an expression for the Euclidean distance, d is the dimensionality of the data object, and $x_{ik}$ and $x_{jk}$ are, respectively, the $k^{th}$ components of the $i^{th}$ and $j^{th}$ objects, $x_i$ and $x_j$.

Once the proximity matrix is generated a clustering approach can be used to separate the data into clusters. One of the following two general approaches can be used: heirarchical or partitional. Hierarchical techniques produce nested sequence of partitions, with a single, all-inclusive cluster at the top and singleton clusters of individual points at the bottom. Hierarchical schemes bisect a cluster to get two clusters or merge two clusters to get one. Hierarchical clustering techniques are thought to produce better quality clusters and have the advantage that a specific number of clusters do not have to be assumed, so the appropriate number of clusters can be revealed during the analysis process. Partitional techniques create a one-level (unnested) partitioning of data points. For example, if K is the desired number of clusters, then partitional approaches find all K clusters at once. The preferable approach for burner diagnostics is the partitional approach whereby the burner states defined above for the cluster classes and individual burners are sorted based on a comparison of the current analysis parameters to the typical analysis parameters in the assessment library.

Specifically, the preferred approach is to use a cluster based on all attributes simultaneously (polythetic) rather than on a single attribute (monothetic). Further, the preferred approach is to incrementally access one object at a time rather than all the objects at the same time. Lastly, the preferred approach strives to place the burner assessment into only one cluster (nonoverlapping) rather allowing for objects to belong to more than one cluster (overlapping). Finally, the results of the proximity matrix can be presented graphically sometimes referred to as a proximity graph.

The observed dynamics can be classified into relevant groups. The number of ways to do this is almost infinite. A common problem with clustering high dimensional data is that the distance (Euclidean measure) between points becomes very uniform, and resolution between clusters is lost. It is possible to improve the resolution of the clustering if the dimensionality of the data can be reduced by selectively choosing those attributes that are most important for the process. Another approach is to use principal components analysis to project high dimension phase space to a lower dimension phase space and perform the cluster analysis on the resulting data set. Critical dynamic information is preserved during this data transformation. The clustering approach described herein may be guided/compared with engineering expertise/experience so that the most effective analysis parameters are used in the cluster analysis. For example, standard deviation may be a suitable parameter for determining coal mill on/off condition; however, many types of clustering results are possible.

Symbol sequence analysis has recently been found to be an especially appropriate method for identifying temporal patterns in a number of different nonlinear processes (J. B. Green, Jr. et al., *Society of Automotive Engineers Technical Paper No.* 1999-01-0221 (1999); J. P. Crutchfield et al., *Physica D* 7, 201 (1983); J. P. Crutchfield et al., *Physical Rev. Lett.* 63, 105 (1989); A. B. Rechester et al., *Phys. Lett. A* 156, 419 (1991); A. B. Rechester et al., *Phys. Lett. A* 158, 51 (1991); X. Z. Tang et al., *Phys. Rev. E* 51, 3871 (1995); U. Schwarz et al., *Astron. Astrophys.* 277, 215 (1995); J. Kurths et al., *Chaos* 5, 88 (1995); M. Lehrman et al., *Phys. Rev. Lett.* 78, 54 (1997); X. Z. Tang et al., *Chaos* 8, 688 (1998); C. E. A. Finney et al., *Society of Automotive Engineers Technical Paper No.* 980624 (1998); C. S. Daw et al., *Phys. Rev. E* 57, 2811 (1998); H. Voss et al., *Phys. Rev. E* 58, 1155 (1998)).

Symbol sequence analysis converts continuous-valued time series measurements into a series of discrete symbols. The range of any given signal may be partitioned into a finite number of bins, where measurements which fall into the same bin are given the same symbolic value. Temporal patterns may be identified in the symbol stream by searching for particular sub-sequences of symbols that occur with a non-random frequency. The transformation into symbols increases the rapidity and ease of the pattern identification process. Symbol sequence analysis is ideal for applications where signal quality is poor because it focuses on the dominant patterns and reduces the effect of noise.

Temporal irreversibility, which is another characteristic feature of non-linear processes, can be used as a direct indicator of dynamic transitions such as bifurcations and chaos. Temporal irreversibility refers to the property of a signal that makes it distinct from a time-reversed version of itself. A simple example of temporal irreversibility is when a signal includes oscillations that characteristically rise slowly and then fall suddenly in a repeating fashion. If such a signal is reversed in time, the new version will exhibit sudden rises followed by slow declines. The times scales associated with temporally irreversible features are often directly related to critical physical processes (J. Timmer et al., *Phys. Rev. E* 61, 1342, 2000; J. B. Green, Jr. et al., Society of Automotive Engineers Technical Paper No. 1999-01-0221, 1999; C. J. Stam et al., *Physica D* 112, 361 1998; B. P. T. Hoekstra et al., *Chaos* 7, 430, 1997; L. Stone et al., *Proc. Roy. Soc. London, Ser. B* 263, 1509 1996; M. J. van der Heyden et al., *Phys. Lett. A* 216, 283 1996; C. Diks et al., *Phys. Lett. A* 201, 221, 1995; A. J. Lawrance, Int. Stat. Rev. 59, 67, 1991; G. Weiss, *J. Appl. Prob.* 12, 831, 1975).

Measurement of temporal irreversibility requires specifically designed dynamic statistics because conventional dynamic statistics like Fourier transforms and autocorrelation cannot detect such changes in time flow. These statistics can be determined either using differences in signal values that are separated in time (referred to here as the time-delay function) or by special types of asymmetries that occur in the symbol-sequence patterns produced by symbolic analysis (referred to here as the symbolic function). Either approach will be effective, but certain combinations of these approaches are optimal for certain types of data. For example, it is often convenient to use the time-delay method to help identify inter-symbol time scales to specify in the symbolic analysis. This is particularly true for assessing the onset of bifurcation instabilities in flames.

Importantly, symbol sequence analysis and/or temporal irreversibility provide systematic methods that can catalogue previous burner operating conditions in the form of libraries against which future measurements can be referenced. Thus symbol sequence analysis and temporal irreversibility obtained from the measured data may be compared with symbol sequence analysis and/or temporal irreversibility libraries previously measured for different burner operating states. Further, the symbol sequence-analysis and/or temporal irreversibility obtained from the data for a particular burner operating state may be added to existing symbol sequence analysis and/or temporal irreversibility libraries or may be used to construct new symbol sequence analysis and/or temporal irreversibility libraries.

Figure 2:
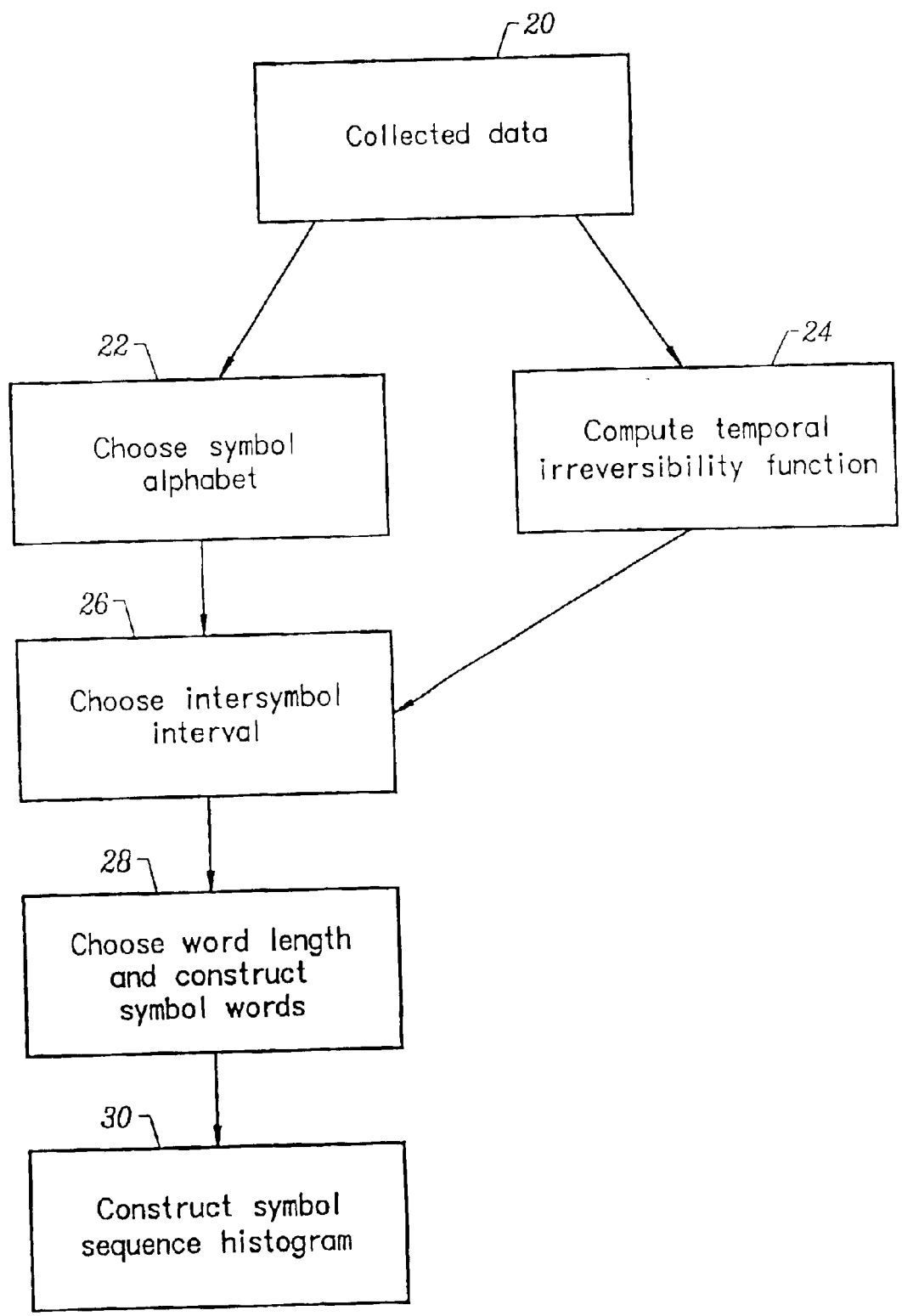
FIG. 2 is a flow diagram that illustrates the technique of sequence symbol analysis with or without calculation of a temporal irreversibility function.

The basic approach to using symbol sequence analysis and/or temporal irreversibility is illustrated in FIG. 2. The collected binary data 20 may be partitioned into discrete bins by choosing a symbol alphabet at 22. Additionally, a temporal irreversibility function may be calculated from the data at 24. A symbol alphabet is the selected number of partitions used to define the symbol set. Preferably, symbol partition boundaries are selected so as to divide the measurement range into equiprobable regions. This choice of symbol partitions is particularly convenient because all possible symbol sequences become equally probable for truly random data. Any sequences that occur non-randomly are highlighted against a random background.

At least three different temporal irreversibility functions may be calculated at 24. The temporal irreversibility functions include a time-delay function called $T_3$ where T refers to a norm. In this function, the degree of temporal irreversibility is the average difference of time-delayed signal values, raised to the third power. This average value is then scaled by a normalizing factor. In mathematical form, the function is:

$$T_3 = [\text{Sum}(x(i+d)-x(i))^3]/[\text{Sum}(x(i+D)-x(i))^2]^{(3/2)}$$

where x denotes a function of signal values, i is a temporal index, D is a delay, Sum denotes a summation over all appropriate temporal indices.

A second temporal irreversibility function is a combination time-delay and symbolic method, called $T_{sgn}$, where Sgn refers to algebraic sign. In this function, the degree of temporal irreversibility is the average tendency for a positive or negative difference of time-delayed signal values. In mathematical form, the function is $$T_{sgn} = \text{Avg}(\text{Sgn }(x(i+D)-x(i)))$$

where Sgn denotes an integer representation of the algebraic sign of the functional argument, Avg denotes the mathematical average, and other symbols are as defined above. The Sgn function might be defined as representing all negative values as −1, a zero value as 0, and all positive values as +1. Accordingly for at least this reason the above function is at least partially a symbolic transformation.

In both of the functions described above, the primary parameter is the time delay. Depending on the significant time scales in the measurement signal, the functions may need to be evaluated over a carefully chosen range of delays. Appropriate inter-symbol intervals for symbolization may be selected from the resultant function, such that the time scales of relevant nonlinear features may be emphasized.

A third function is a symbolic function, called $T_{sym}$, where sym denotes symbolization. In this method, the degree of temporal irreversibility is measured by the differences in the symbol sequence histogram of occurrence frequencies of selected symbolic words and their time-inverse counterparts. The sum of differences may be measured with a variety of norm functions such as the Euclidean norm or a chi-square statistic.

In the $T_{sym}$ function, the degree of temporal irreversibility depends on the symbolization parameters, namely the alphabet, the symbolic word length, and the inter-symbol interval. Alphabet refers to the number of possible symbols allowed over the range of the sensor signal. Symbolic word length refers to the number of sequential symbols considered in finding temporal patterns. Inter-symbol interval refers to the specified time interval between successive symbols. Careful choice of these parameters may be needed to maximize utility of the $T_{sym}$ function. Typically, an inter-symbol interval is determined at 26 by finding the time interval at which the $T_3$ or $T_{sgn}$ function is maximally deviated from zero. Other criteria may also be used for choosing the inter symbol interval, including the autocorrelation and mutual information functions and the relative frequency of repeating symbols.

Symbolic word length is typically determined at 28 by finding the maximum integral number of inter-symbol intervals that span the average cycle time of the signal (i.e., the time between successive upcrossings of the mean). Symbolic alphabet size (i.e., the number of possible symbols) is set so that significant changes in the sensor signal amplitude are captured. For typical burner data, the symbol alphabet ranges from a minimum of two to a maximum of eight. After determining inter-symbol interval and symbolic word length, the relative frequencies for each possible word are determined by moving an imaginary template of that length through the entire symbol stream and summing the relative frequencies of each in a symbol sequence histogram at 30.

In making the above determinations, the key objective is to ensure that the resulting transform of the original sensor signal is sensitive to the amplitude and time scales of the important flame events (e.g., flame lifting, flame flaring, extinction and re-ignition). Thus, specific symbol parameters used may possibly depend on the specific type and/or model of burner and how that burner is configured with other burners in the boiler. In some situations, it may also be useful to use signal pre-processing before defining the symbolization parameters (e.g., high-pass and low-pass filtering) to enhance the visibility of the key events in the signal. When proper pre-processing and symbol parameter selection are combined, the flicker patterns from the important flame events may be transformed into distinct symbol sequence histograms regardless of whether the underlying dynamics are linear or nonlinear.

The technique illustrated in FIG. 2 is preferably assembled into software or sets of software at 8 in the block diagram illustrated in FIG. 1. The software may consist of modified pre-existing programs and newly developed programs. Computer 6, following the instructions from software 8, may transform the collected data into standard statistics or Fourier transforms or symbol sequence histograms or temporal irreversibility functions or any combination thereof, which may be sent to a display 10 for inspection by an operator to determine the operating state of the burner flame. The nature of the display is not critical to the practice of the invention. Alternatively, computer 6 may compare the present standard statistics or Fourier transforms or symbol sequence histograms and temporal irreversibility characteristics or any combination thereof against an appropriate reference library of these measurements to determine the operating state of the burner flame as shown in FIG. 3.

Figure 3:
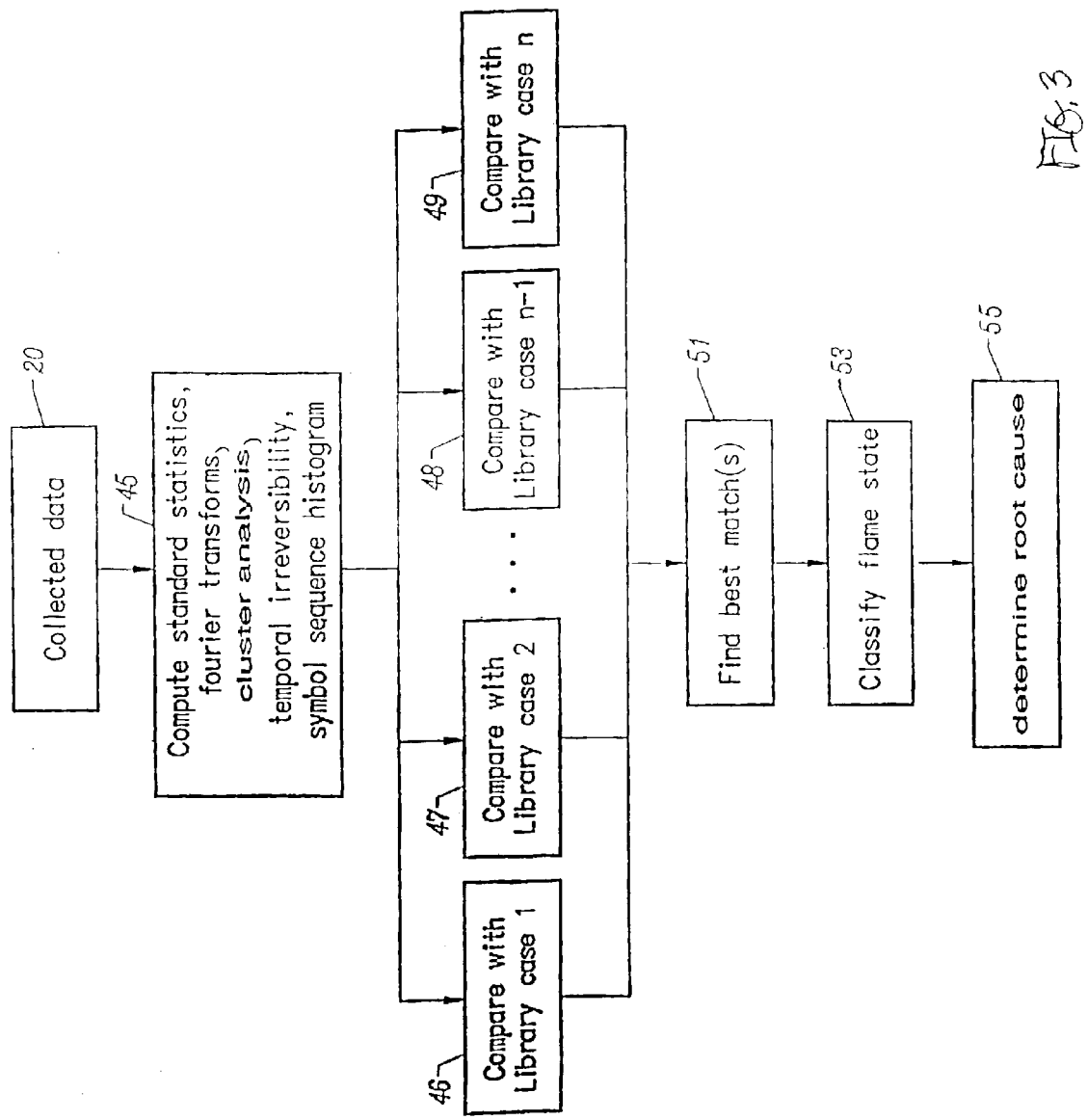
FIG. 3 is a flow diagram that illustrates the method of the invention.

Referring now to FIG. 3, data is collected at 20 and analyzed by conventional statistics, Fourier transforms, cluster analysis, temporal irreversibility or symbol sequence analysis or any combination thereof at 45. The analyzed data for the current burner operating state is then compared with a library of operating states (i.e., 46, 47, 48 and 49) to find the best match(es) at 51. Preferably, the library of operating states will contain at least temporal irreversibility, and symbol sequence histograms. If desired, the library of operating states may also contain either conventional statistics, Fourier transforms, cluster analyses or all of the foregoing. The current flame state is then classified at 53, and the probable root cause(s) of non-optimal flame condition are identified at 55.

The probable root cause(s) of non-optimal flame conditions can be determined based on the set of analysis results from an individual flame. For example, kurtosis, which indicates the degree of peakedness of a distribution relative to a normal distribution, can be used to determine the root cause. A distribution having a relatively high peak is called leptokurtic (negative kurtosis) while a curve which is flat-topped is called platykurtic (positive kurtosis). The normal distribution (Gaussian) is called mesokurtic. Kurtosis measures the deviation from Gaussian structure. An optimal flame produces a nearly Gaussian distribution. A lifted or detached flame from excessively high air flow produces a positive deviation from Gaussian distribution. Unsteady fuel feed due to high coal flow or low air flow produce negative kurtosis.

The skewness indicates the degree of asymmetry, or departure from symmetry, of a distribution. If the frequency curve of a distribution has a longer tail to the right of the central maximum than to the left, the distribution is said to be skewed to the right or have a positive skewness. It describes how balanced the power distribution function for the current series of data is. A large positive skewness indicates a flame burst or drifting. A large negative skewness indicates a flame extinction or dropping out. A low skew (near zero) is indicative of a stable flame.

Temporal irreversibility may also be correlated with root causes, such as the primary air/coal ratio. For example, and as discussed in connection with FIG. 20 below, an increase in the primary air/coal ratio may result in a significant deviation in the in the temporal irreversibility parameter indicated as T3R from the curve for the nominal primary air/coal ratio at small lag values. A decrease in the primary air/coal ratio may be characterized by a slow oscillation of flame signal dc-component, which is caused by the coal dropping out in the coal line to the burner, accumulating in a dead zone until the restriction in the flow area is reduced to a point where the air flow is sufficient to blow the accumulated coal clear. This causes alternating fuel rich ("slugs") and fuel lean conditions in the flame zone, which is reflected in the flame scanner signal as alternating low and high values in signal strength. Also, the value of the temporal irreversibility parameter deviates from the nominal value at large lag values, and the low frequency instability associated with slugging is more apparent at longer lags.

Symbol sequence analysis may also be performed to identify root cause(s) of flame instabilities. For example, and as discussed in connection with FIGS. 16 and 17 below, deviations in primary air/coal ratio may be flagged by specific symbol sequence values that exhibit sensitivity in changes to this burner operating parameter. By examining the symbol sequence histogram, specific types of instabilities can be reliably identified and included in the messaging to the operator.

Similar trends can be generated for burner performance as a function of other burner settings such as secondary air flow, register setting, swirl setting, etc. For example, the operating state of the burner flame may be correlated to the total A/F ratio of the burner flame. The operating state of the burner flame may also be correlated to the primary air/coal ("PA/C") ratio of the burner flame. A brief description of each flame state along with potential root causes is summarized as follows:

A "stable" flame is a solid, well attached flame.

An "edge lifted" or "partially detached" flame exhibits detachment or a tendency for detachment around portions of the coal nozzle. The root causes of this instability include, but are not limited, to low coal flow (primary air/coal ratio) relative to nominal design conditions, obstructed coal nozzle, roping of coal in the coal pipe which causes a maldistribution of coal across the exit of the coal pipe, or the grind of the coal being too coarse.

A "sporadically detached" flame detaches fully from the coal nozzle on an intermittent basis. The root causes of this instability include, but are not limited to, high primary air relative to nominal design conditions, high coal flow, inner spin vanes are too far open, the grind of the coal being too coarse, and the mixing device, if used, may be retracted too far.

A "fully detached" flame consistently has no attachment to the coal nozzle. The root causes of this instability include, but are not limited to, relatively high primary air or relatively high coal flow.

A "flaring" flame is wide and bushy. The root causes of this instability include, but are not limited to, spin vanes that are closed too much or the mixing device, if any, may be inserted too far into the furnace.

A "pancaked" flame is an extreme form of flaring where the flame is almost flat and parallel to the burner wall. The root causes of this instability include, but are not limited to, spin vanes that are closed too much or the mixing device, if any, is inserted too far into the furnace.

A "flapping" flame moves side-to-side. The root causes of this instability include, but are not limited to, spin vanes that are too far open or relatively low secondary air flow.

An "unsteady fuel feed" or "slugging" flame exhibits slow oscillations in the dc-component of the signal. The root causes of this instability include, but are not limited to, relatively low primary air or high coal flow together with relatively low primary air.

If the operating state of the burner flame 2 is non-optimal, control unit 12 (preferably, a traditional distributed control, or neural network system or a combination thereof) may be used to adjust various parameters associated with the burner flame. These include, but are not limited to, altering the primary air/coal ratio, changing the overall excess air and changing the inner vane and outer vane settings. Ideally, adjustment of these parameters will return the burner flame to an optimal operating state. Preferably, computer 6 supplies information on the operating state of each burner flame to control unit 12. Control unit 12 can then adjust the parameters associated with the burner flame 2. In a preferred embodiment, the apparatus of the invention is completely automated.

Figure 4:
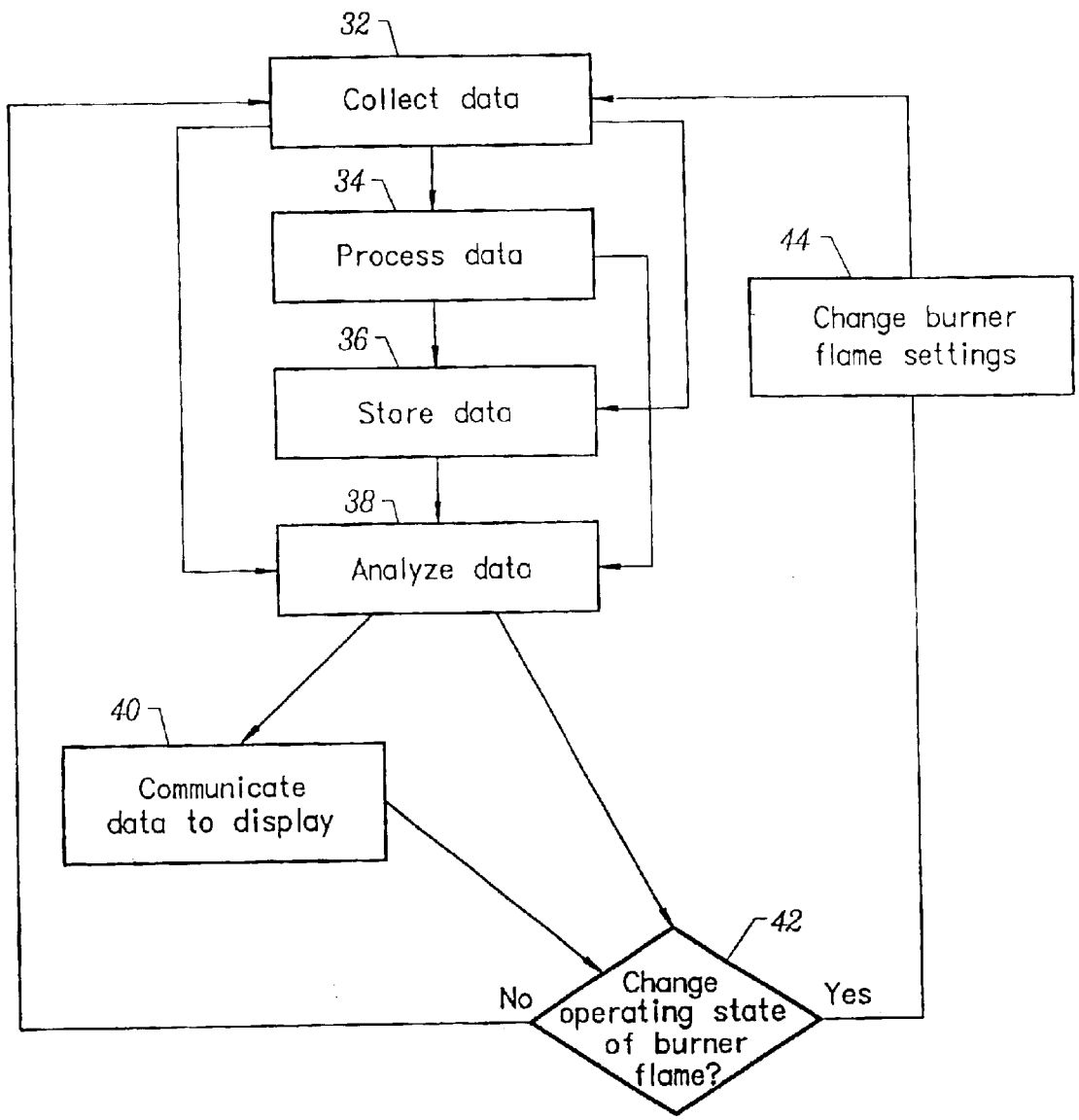
FIG. 4 is a flow diagram that illustrates a method of analyzing collected data.

FIG. 4 illustrates the process of the current invention, which commences with data collection from a burner flame, typically by a sensor at step 32. The burner flame is preferably, an oil flame or a low-$NO_x$ coal flame. Preferably, the sensor is an optical scanner (more preferably, an infrared scanner). Alternatively, the sensor may be a pressure transducer or an acoustical transducer.

The data or signal may be processed at 34 in FIG. 4 to remove sensor artifacts by procedures previously described or other methods well known to the skilled artisan. If deemed necessary, the collected data may be stored in a physical device such as tape, hard drive, etc. at 36 as previously described. It should be noted that steps 34 and 36 are optional and thus may be practiced together, independently, or not at all in the current invention. Thus, for example, data collected at step 32 may be directly analyzed at step 38 without proceeding through steps 34 and 36. Collected data may be stored at 36 without being processed in some embodiments. Other variations will be obvious to the skilled artisan.

The collected data may be analyzed by symbol sequence techniques or temporal irreversibility or conventional statistics or Fourier transforms or cluster analysis or any combination thereof at step 38, as previously described. Preferably, the collected data is analyzed by a suitably programmed digital computer. In a preferred embodiment, the collected data is converted to a symbol sequence histogram by sequence symbol techniques and/or temporal irreversibility. The symbol sequence histograms or temporal irreversibility functions or conventional statistics or Fourier transforms or cluster analysis or any combination thereof may be stored for later use if desired. The data may be communicated to a display where it is graphically displayed at step 40.

After data analysis and/or communication to a display, decision step 42 in FIG. 4 is the next step in the method of the current invention. Here, a decision is made whether to change the operating state of the burner flame. Preferably, the current operating state of the burner flame is compared to a library of burner operating states to determine if the current burner flame operating state is non-optimal as described in FIG. 3. Further, the root cause(s) associated with any non-optimal flame states, bifurcations or instabilities is also determined by comparison to a library of root causes associated with particular non-optimal flame states as described above.

Non-optimal operating states of burner flames include, but are not limited to edge lifting flames, sporadic lifting flames, unsteady fuel feed flame and other described above. Further, the operating state of burner flame may be correlated to the A/F ratio or to the primary air/coal ratio of the burner flame. When the answer is yes, control passes to 44 where burner flame settings such as those previously described are changed. For example, operating parameters may be changed, equipment malfunctions may be corrected, or equipment may be replaced. After step 44, control passes back to step 32 where the process can be repeated, if desired. Alternatively, when the answer to the decision made in step 42 is negative, control passes directly to step 32.

EXAMPLE

The following example is offered solely for the purpose of illustrating features of the present invention and is not intended to limit the scope of the present invention in any way.

Data was acquired at McDermott Technology Incorporated's (Alliance, Ohio) Clean Environment Development Facility ("CEDF") in Alliance, Ohio. The CEDF is designed to test a single 100-Mbtu (30-$MW_t$) burner at near commercial scale. Flow patterns, temperatures, residence times and geometry are representative of a middle row burner in a commercial utility boiler. All measurements were made using one of two eastern bituminous coals.

Figure 5:
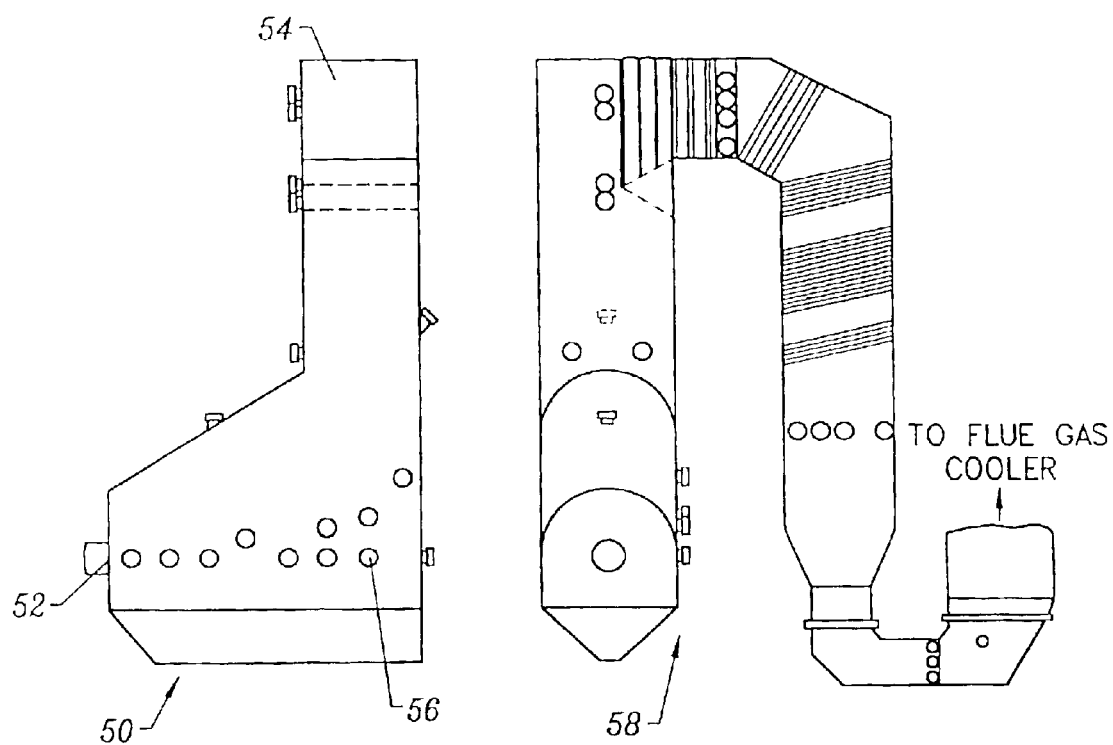
FIG. 5 illustrates an overall profile view of the CEDF.
Figure 6:
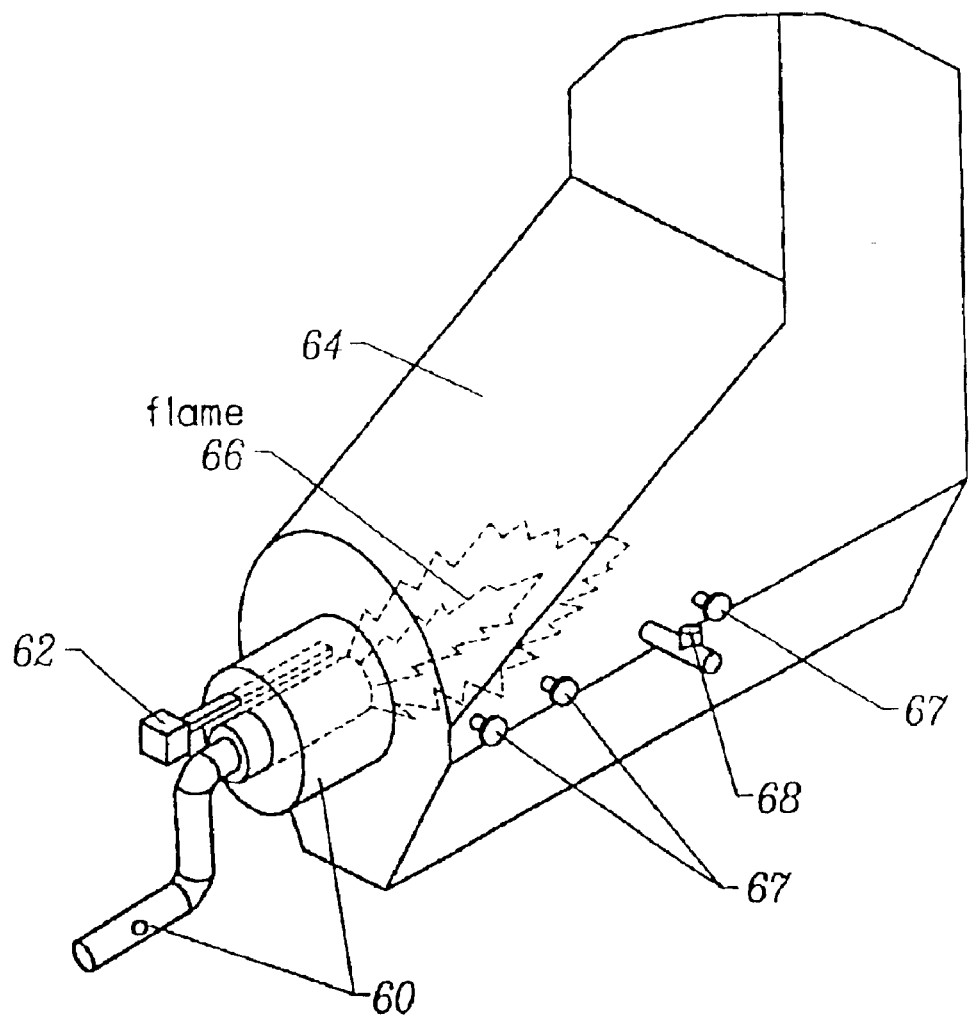
FIG. 6 illustrates a schematic view of the CEDF.

FIG. 5 illustrates an overall profile view of the CEDF. A side view of the CEDF is illustrated in 50. Here, 52 is a burner, while 54 is the furnace exit. Sight and access ports are located for example at 56. A front view of the CEDF is illustrated in 58. FIG. 6 shows a schematic view of the CEDF that illustrates the approximate location of optical, acoustical and pressure sensors. Thus pressure transducers 60, and optical sensors 67 are located on the sides of the CEDF along with acoustical transducers 68. A flame scanner 62 is located next to flame 66 which is inside enclosure 64.

An XCL-type, low-$NO_x$ burner (shown in FIG. 7) was used for all measurements in the CEDF. The burner 70 fires a mixture of primary air and pulverized coal 72 via a tubular burner nozzle 74 to a flame stabilizer end 78. Secondary air 104 is provided from windbox 82 and enters burner barrel 80 via bell mouth opening 84 to inner and outer passageways 86 and 88 to combustion chamber 106. Outer 90 and inner spin vanes 92 in the inner and outer passageways 86 and 88 swirl the admitted secondary air 104 prior to discharge into the combustion chamber 106. Ignition devices, (not shown) ignite primary air and pulverized coal mixture 72 in combustion chamber 106 to provide flame 102.

Generally, low-$NO_x$ burners can stage air and fuel mixing so that peak flame temperature is minimized, which lowers the production of thermal $NO_x$. In staged combustion, fuel and a portion of the air (i.e., the primary air) are initially ignited and then mixed with the remainder of the air (i.e., the secondary air) to complete the combustion process. In the type of burner illustrated, mixing between coal, primary air and secondary air (i.e., the degree of staging) is controlled by adjusting coal feed rate, swirl vane position, throat configuration, overall excess air and primary-air-to-coal ratio.

In the CEDF, test signals were recorded using two different conventional optical flame scanners: the Forney Corporation DR-6.1 dual-range unit and the Fossil Power System's (FPS) Spectrum VIR VI scanner. Measurements were made under different burner operating conditions. All analog data was recorded on 8-mm tape with a digital audio tape recorder at 24 kHz with 14-bit resolution. Re-sampling and transfer of the data from tape to a personal computer was accomplished by playing the tape back to a PC-mounted interface board. The interface board and tape recorder are not required to practice the current invention.

Figure 8A:
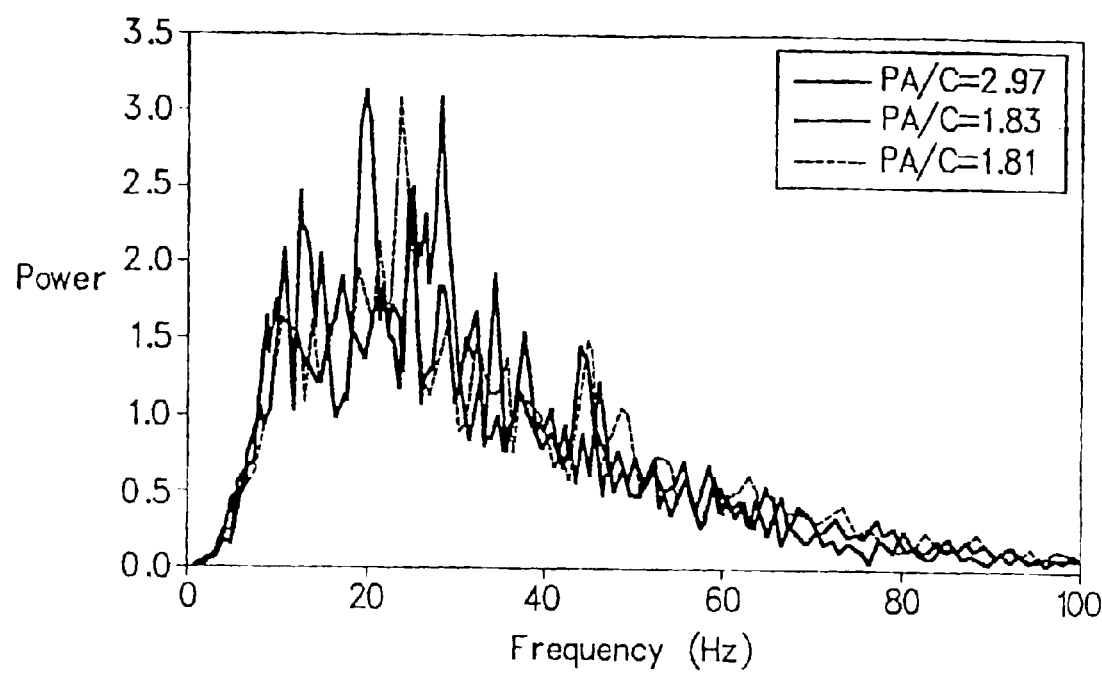
FIG. 8($a$) illustrates Fourier power spectra for different burner conditions on a linear scale.
Figure 8B:
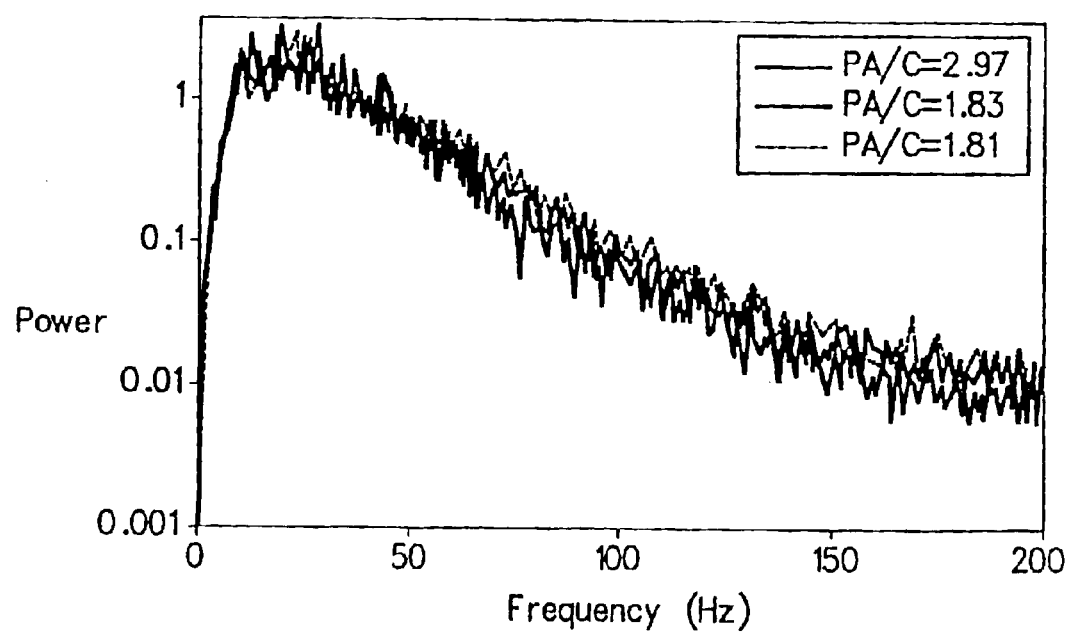

Initially, the recorded signals were characterized in terms of their standard statistics such as overall range, variance, and standard deviation and Fourier transforms. Fourier power spectra of the measured scanner signals are shown in FIGS. 8a and 8b on a linear and logarithmic scale, respectively. As can be seen from FIGS. 8a and 8b there are significant problems in relying solely on Fourier power spectra to determine burner operating states. Two of the conditions are very similar (PA/C=1.81 and 1.83, respectively, representing a normal flame) while the third condition is very different (PA/C is 2.97, representing a lifted flame). On both a linear and logarithmic scale, spectral separation is quite difficult as can be seen in FIG. 8a and FIG. 8b. Typically, the uncertainty from measurement to measurement is often as large as the variations produced by extremely significant performance changes in Fourier power spectra. Further, the power spectral distributions would be considered very nearly the same when compared with conventional statistical analysis techniques.

Figures 9A, 9B:
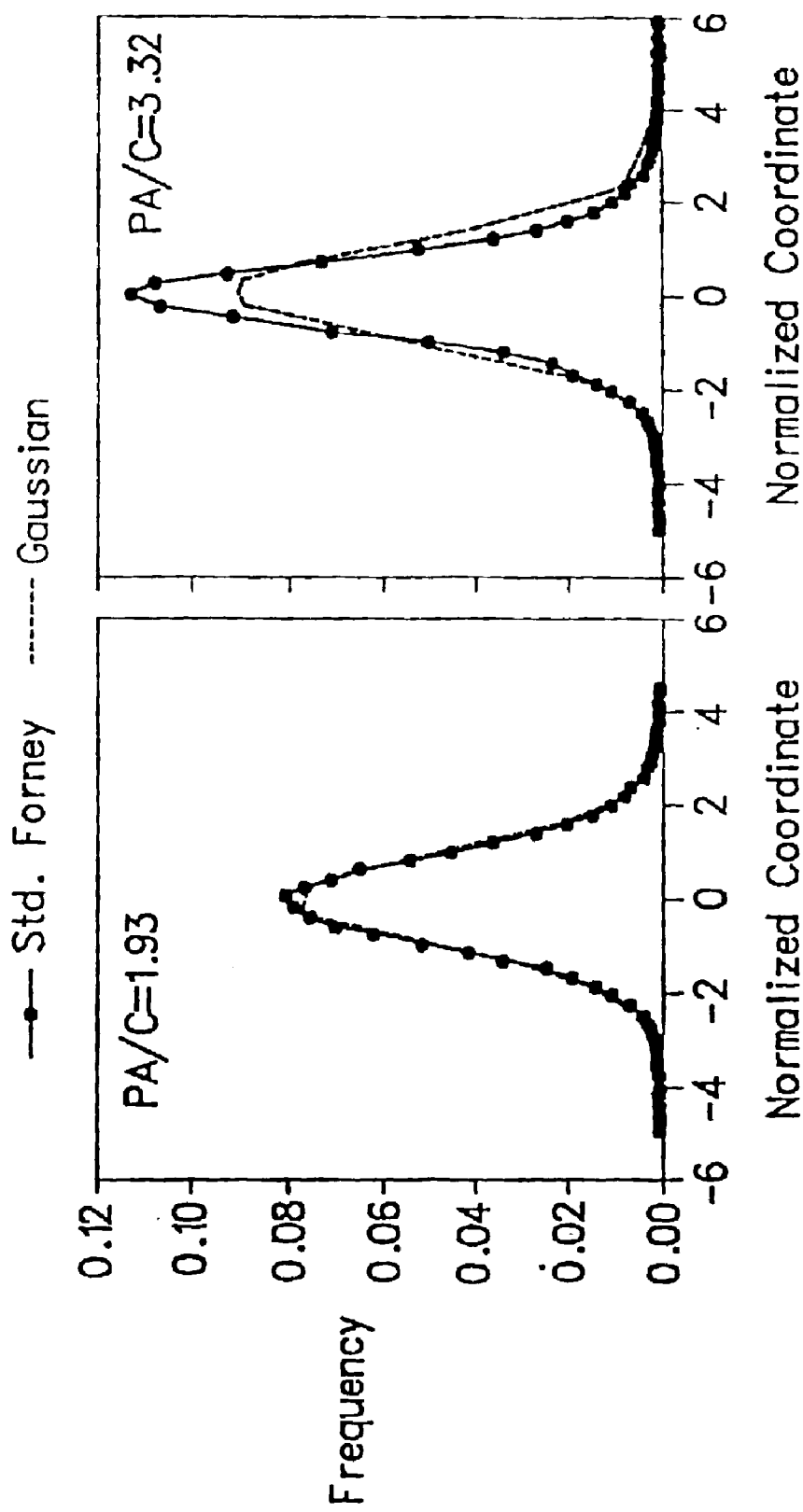
FIG. 9($a$) illustrates a histogram for a burner with a PA/C ratio of 1.93.

Measurements revealed a connection between standard statistics for optical signals and burner operation. FIG. 9 illustrates histograms for two standard Forney signals generated by a baseline flame (FIG. 9a) and one that is significantly lifted (FIG. 9b). As can be seen, the flicker pattern from the baseline flame produces a near Gaussian signal distribution, while the flicker pattern of the lifted flame deviates significantly from a Gaussian distribution. Thus, low-dimensional, non-linear dynamics appear near burner operating limits and may be associated with non-Gaussian frequency distributions.

Figure 10:
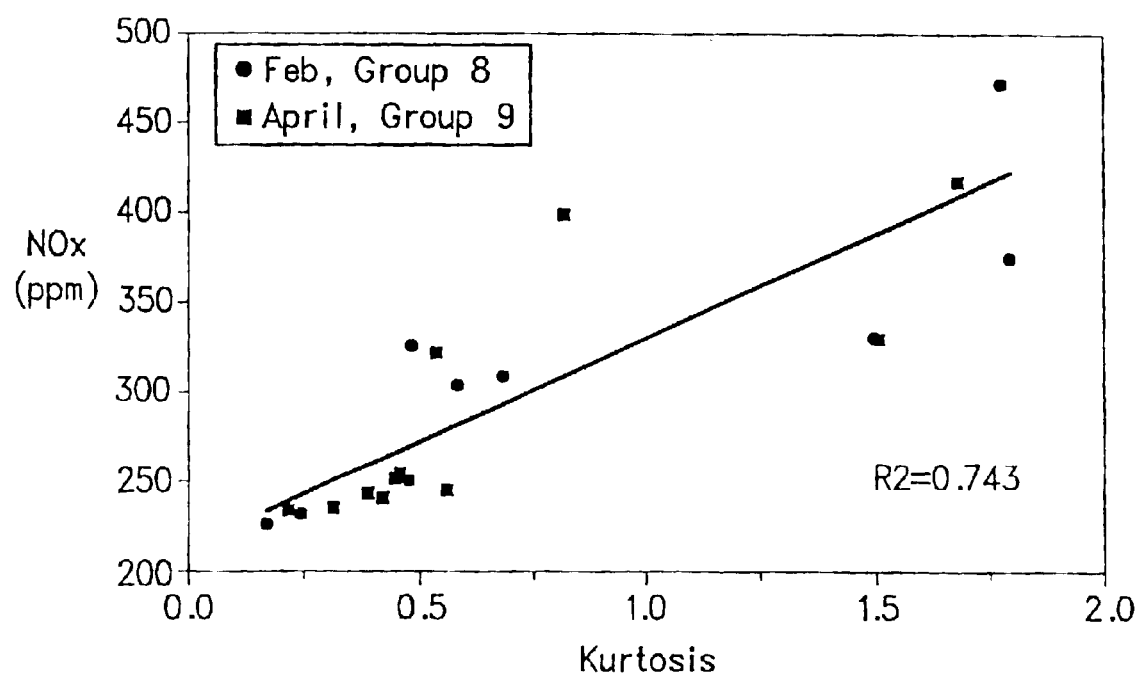
FIG. 10 illustrates a correlation between kurtosis and $NO_x$ emission.
Figure 19:
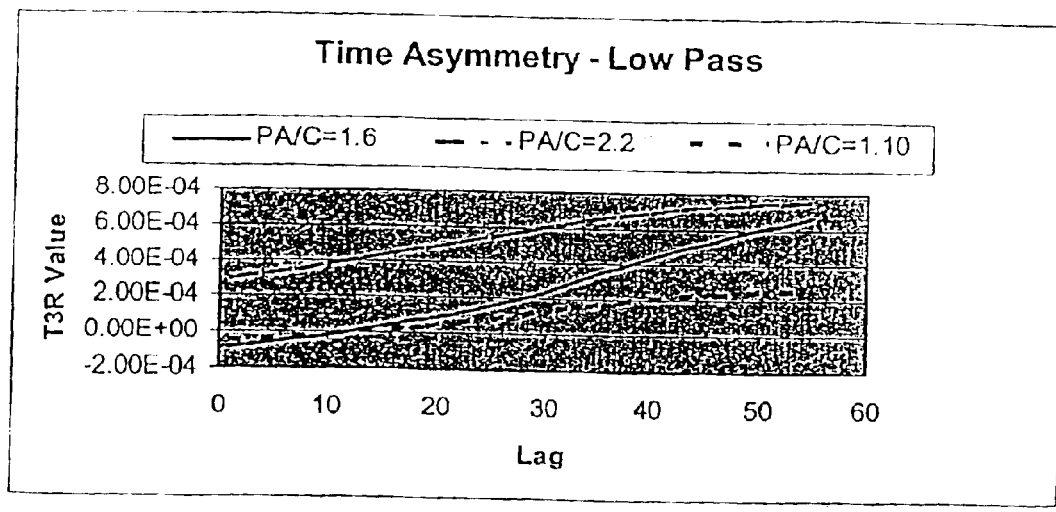
FIG. 19 illustrates the change in the T2R value with a change in the lag as a function of the primary air/coal ratio.

Kurtosis is another convenient method for measuring deviation from Gaussian distribution (W. A. Press et al., *Numerical Recipes: The Art of Scientific Computing*, Cambridge University Press (1992)). FIG. 10 illustrates that kurtosis of the optical scanner is correlated with $NO_x$ emission. Increasing kurtosis (i.e., non-Gaussian structure) is associated with higher $NO_x$ emission. In this case, the increasing kurtosis reflects the bifurcated flame state that causes lifting. FIG. 19 indicates the relationship between kurtosis and the primary air/coal ratio.

Figure 11:
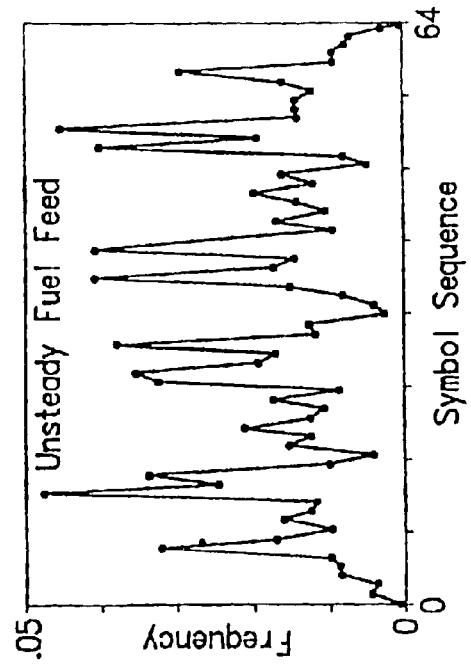
FIG. 11 illustrates a symbol sequence histogram for an optimally stable flame.

Application of symbol sequence analysis to recorded flame scanner signals revealed that an optimally stable flame is maximally dimensional. An optimally stable flame has the symbol sequence shown in FIG. 11. Significantly, an optimally stable flame has a broad symbol sequence histogram without any dominant peaks. Further, kurtosis of an optimally stable flame is low.

Figure 13:
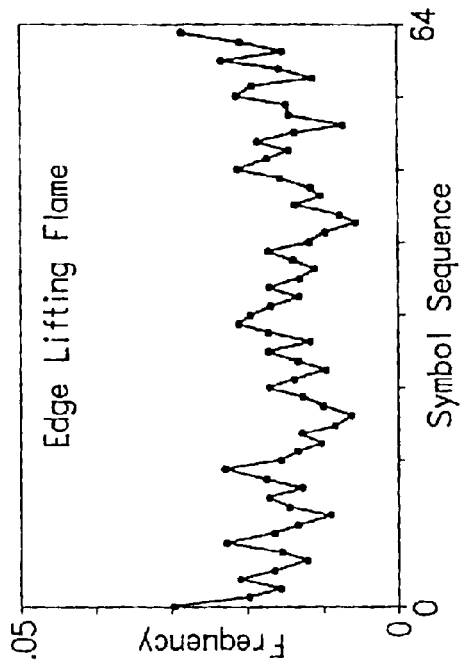
FIG. 13 illustrates a symbol sequence histogram for a sporadic lifting flame.
Figure 14:
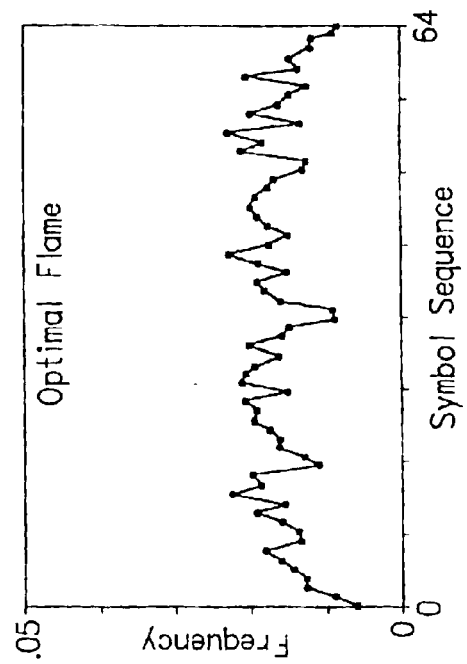
FIG. 14 illustrates a symbol sequence histogram for an unsteady fuel feed flame.
Figure 12:
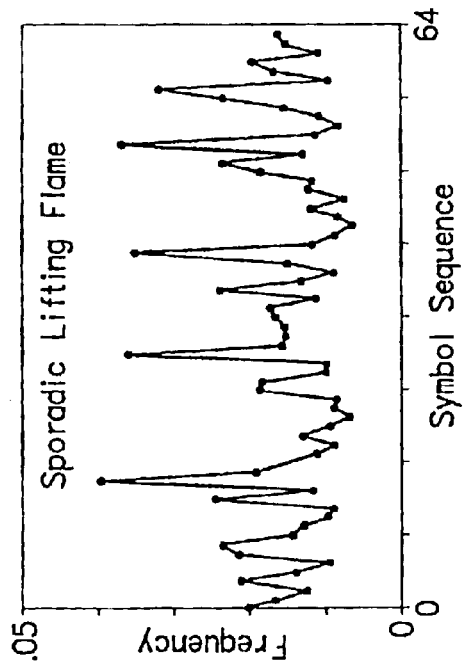
FIG. 12 illustrates a symbol sequence histogram for an edge lifting flame.

Movement away from maximum dimension to low dimensional behavior represents a shift from optimally stable flame conditions. This is illustrated in FIGS. 12, 13 and 14 which illustrate undesirable burner operating states such as a edge lifting flame, a sporadic lifting flame and a unsteady fuel feed flame, respectively. These symbol sequence histograms are associated with specific unstable periodicities and low-dimensional structure.

Figure 15:
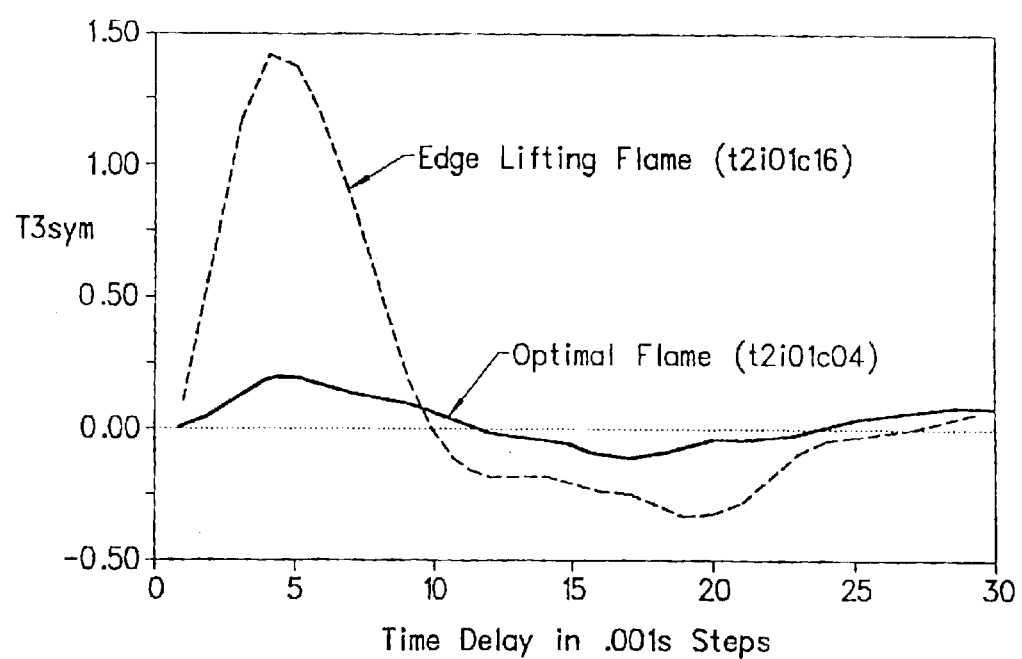
FIG. 15 illustrates the $T_3$ time asymmetry function for an edge lifting flame and an optimally stable flame.
Figure 16:
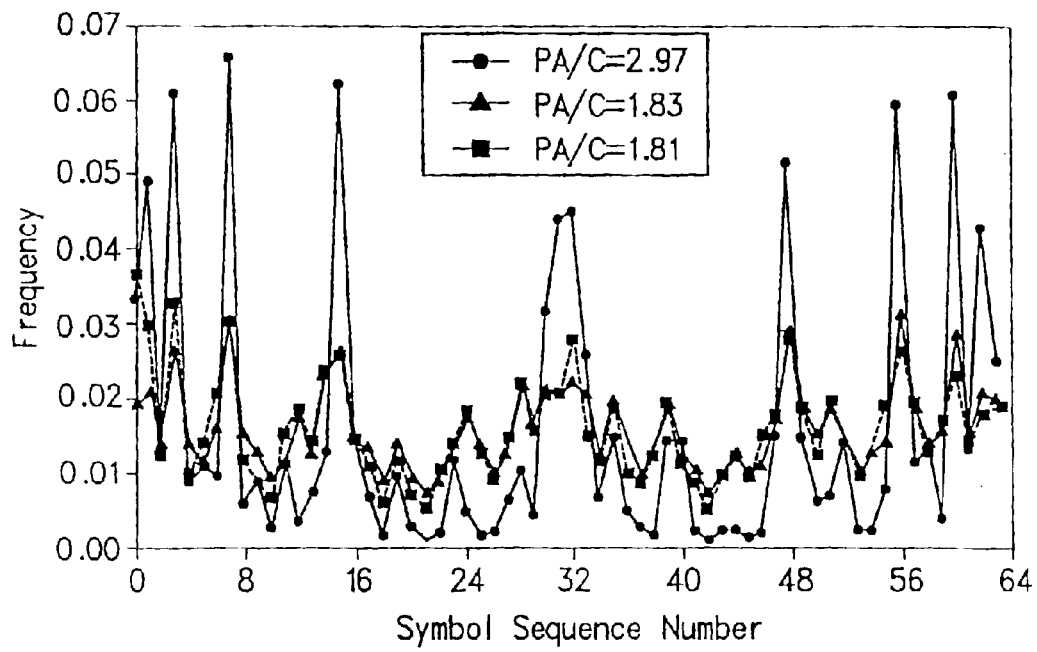
FIG. 16 illustrates the resolution of the symbol sequence histogram for different PA/C ratios.

FIG. 15 illustrates the $T_3$ time irreversibility function for edge lifting and optimally stable flames. As can be seen in this example, unstable burner conditions are associated with greater time asymmetry. FIG. 16 illustrates symbol sequence histograms acquired for the same different burner conditions depicted in FIG. 8. As can be seen through comparisons of FIG. 8 and FIG. 16, the symbol sequence histograms can readily discriminate between burner operating states that have different PA/C ratios, while Fourier power spectra cannot.

Figure 17:
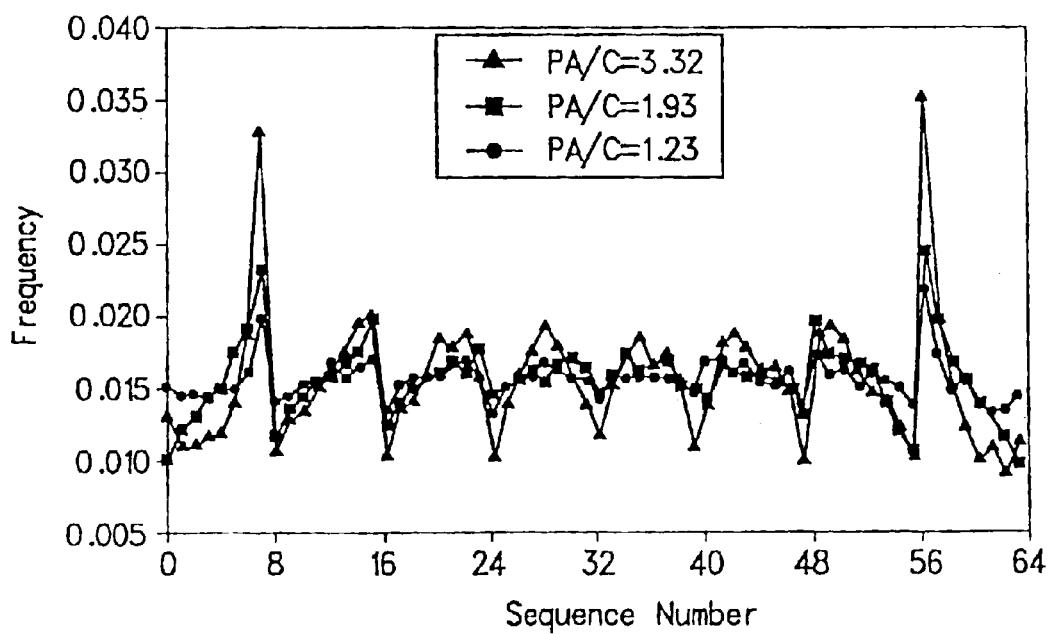
FIG. 17 illustrates the response of the symbol sequence histogram to variations in the PA/C ratio.

Finally, as shown in FIG. 17, data obtained from flame scanners may be used to provide a measure of the PA/C ratio for a burner flame. In FIG. 17, the symbol sequence histogram varies directly with increasing PA/C ratio for data collected on the Clean Environment Development Facility. FIGS. 16 and 17 also illustrate that by examining the symbol sequence histogram, specific types of instabilities can be reliably identified and included in the messaging to the operator.

Figure 18:
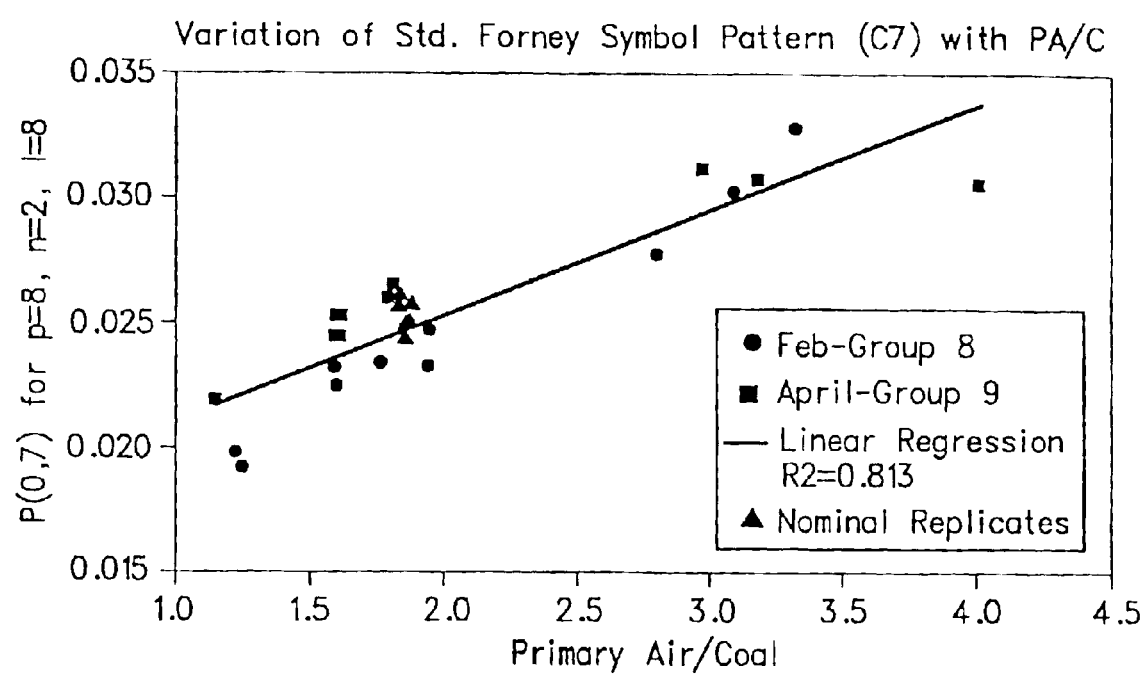
FIG. 18 illustrates correlation of a symbol sequence parameter with the PA/C ratio.

In FIG. 18, a specific symbol sequence parameter is correlated to the PA/C ratio to yield a linear relationship between PA/C ratio and the symbol sequence parameter. It should be noted that other symbol sequence parameters can be used and symbol sequence parameter may vary. Further, the symbol sequence parameter is tunable for different burner types.

FIG. 19 illustrates the change in the T2R value with a change in the lag as a function of the primary air/coal ratio. The nominal primary air/coal ratio in FIG. 19 is 1.6. When the primary air/coal ratio is increased to 2.2 a fully detached flame is obtained. The temporal irreversibility parameter indicated as T3R deviates significantly from the curve for the nominal primary air/coal ratio at small lag values. The analysis identifies the high frequency instability associated with detachment at the short lags.

When the primary air/coal ratio is decreased to 1.1 the flame exhibits slugging conditions characterized by a slow oscillation of flame signal dc-component. This is caused by the coal dropping out in the coal line to the burner, accumulating in a dead zone until the restriction in the flow area is reduced to a point where the air flow is sufficient to blow the accumulated coal clear. This causes alternating fuel rich ("slugs") and fuel lean conditions in the flame zone. This is reflected in the flame scanner signal as alternating low and high values in signal strength. As shown in the FIG. 20, the value of the temporal irreversibility parameter deviates from the nominal value at large lag values. The low frequency instability associated with slugging is more apparent at longer lags.

Finally, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

All publications and patents cited herein are incorporated herein by reference in their entirety.

What is claimed is:

1. A method of evaluating the flame state of a burner flame, comprising:
   obtaining operating data from a burner flame;
   constructing a symbol sequence histogram from said operating data;
   comparing said symbol sequence histogram to a pre-existing library of symbol sequence histograms to identify a non-optimal flame state of said burner flame; and
   identifying a root cause of said non-optimal flame state.

2. The method of claim 1, wherein said non-optimal flame state is selected from the group consisting of an edge-lifted flame, a sporadically detached flame, a fully detached flame, a flaring flame, a pancaked flame, a flapping flame, and a slugging flame.

3. The method of claim 1, further comprising analyzing said operating data using a technique selected from the group consisting of conventional statistical analysis, Fourier transform analysis, cluster analysis, temporal irreversibility analysis, and combinations thereof.

4. The method of claim 1, further comprising computing a temporal irreversibility function from said operating data; and wherein said comparing further comprises comparing said temporal irreversibility function to a pre-existing library of temporal irreversibility functions.

5. The method of claim 1, wherein said identifying comprises correlating said non-optimal flame state to a process operating parameter.

6. The method of claim 1, wherein said identifying comprises correlating said non-optimal flame state to a piece of operating equipment.

7. A method for optimizing a burner flame, comprising:
   obtaining operating data from a burner flame;
   constructing a symbol sequence histogram from said operating data;
   comparing said symbol sequence histogram to a pre-existing library of symbol sequence histograms to identify a non-optimal flame state of said burner flame;

identifying a root cause of said non-optimal flame state; and reducing the effect of said root cause on said burner flame.

8. The method of claim 7, wherein said non-optimal flame state is selected from the group consisting of an edge-lifted flame, a sporadically detached flame, a fully detached flame, a flaring flame, a pancaked flame, a flapping flame, and a slugging flame.

9. The method of claim 7, further comprising analyzing said operating data using a technique selected from the group consisting of conventional statistical analysis, Fourier transform analysis, cluster analysis, temporal irreversibility analysis, and combinations thereof.

10. The method of claim 7, further comprising computing a temporal irreversibility function from said operating data; and wherein said comparing further comprises comparing said temporal irreversibility function to a pre-existing library of temporal irreversibility functions.

11. The method of claim 7, wherein said identifying comprises correlating said non-optimal flame state to a process operating parameter.

12. The method of claim 7, wherein said identifying comprises correlating said non-optimal flame state to a piece of operating equipment.

13. The method of claim 7, wherein said reducing comprises controlling process operating parameters based upon said root cause.

14. A method of monitoring the operating state of a burner flame, said method comprising the steps of:

obtaining data on the operating state of the burner flame; and analyzing the data with symbol sequence techniques to determine the operating state of the burner flame in which the operating state of the burner flame is a unsteady fuel feed flame.

15. A method of monitoring the operating state of a burner flame, said method comprising the steps of:

obtaining data on the operating state of the burner flame;

analyzing the data with symbol sequence techniques to determine the operating state of the burner flame; and computing a temporal irreversibility function from the data in which the operating state of the burner flame is a unsteady fuel feed flame.

* * * * *